(12) United States Patent
Yoshikawa et al.

(10) Patent No.: US 7,953,835 B2
(45) Date of Patent: May 31, 2011

(54) NETWORK MANAGEMENT METHOD AND NETWORK MANAGEMENT PROGRAM

(75) Inventors: Shigehiro Yoshikawa, Kawasaki (JP);
Hiroshi Yazawa, Kawasaki (JP); Emeric Viel, Kawasaki (JP); Yoshinobu Hibi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 11/975,639

(22) Filed: Oct. 19, 2007

(65) Prior Publication Data

US 2008/0104236 A1 May 1, 2008

(30) Foreign Application Priority Data

Oct. 27, 2006 (JP) ................................. 2006-292594
Aug. 8, 2007 (JP) ................................. 2007-206814

(51) Int. Cl.
*G06F 15/16* (2006.01)
(52) U.S. Cl. ...................................................... 709/223
(58) Field of Classification Search .................. 709/223, 709/224, 245
See application file for complete search history.

(56) References Cited

U.S. PATENT DOCUMENTS

2005/0102549 A1* 5/2005 Davies et al. ..................... 714/4
2007/0250518 A1* 10/2007 Chu et al. ...................... 707/100

FOREIGN PATENT DOCUMENTS

JP 2005-322069 11/2005

OTHER PUBLICATIONS

Yu Yoshioka, "[Entry-level] Basis of storage that should be known (First half. [Feature of San]." Nikkei BP Company, Apr. 4, 2006. (In Japanese with English language translation).
Tetsuya Tsuji, "[Practical] version that should be known before introduction. Special Ed.: SAN introduction practical technique (the third lecture." Brocade Communications Systems, Inc., Feb. 4, 2003. (In Japanese with English language translation).

* cited by examiner

*Primary Examiner* — Wing F Chan
*Assistant Examiner* — Andrew Woo
(74) *Attorney, Agent, or Firm* — Greer, Burns & Crain, Ltd.

(57) ABSTRACT

Blade enclosures are connected to storage devices through FC switches, and management blades and FC switches are connected to a SAN management device. Automatic setting modular program displays an input screen on a display. A manager inputs IP addresses of FC switches so as to be associated with IP address of management blade into input screen. The automatic-setting modular program acquires the server blade information from the management blades, turns on the powers of the server blades, and acquires the FC switch information from the FC switches. The program associates the slot numbers contained in the server blade information acquired from the management blades to the port numbers contained in the FC switch information acquired from the FC switches in one-to-one relationships. The program generates records that are combinations of the server blade information and the FC switch information, and stores the generated records in connection definition table.

12 Claims, 25 Drawing Sheets

61a: Connection definition table

Figure 1:
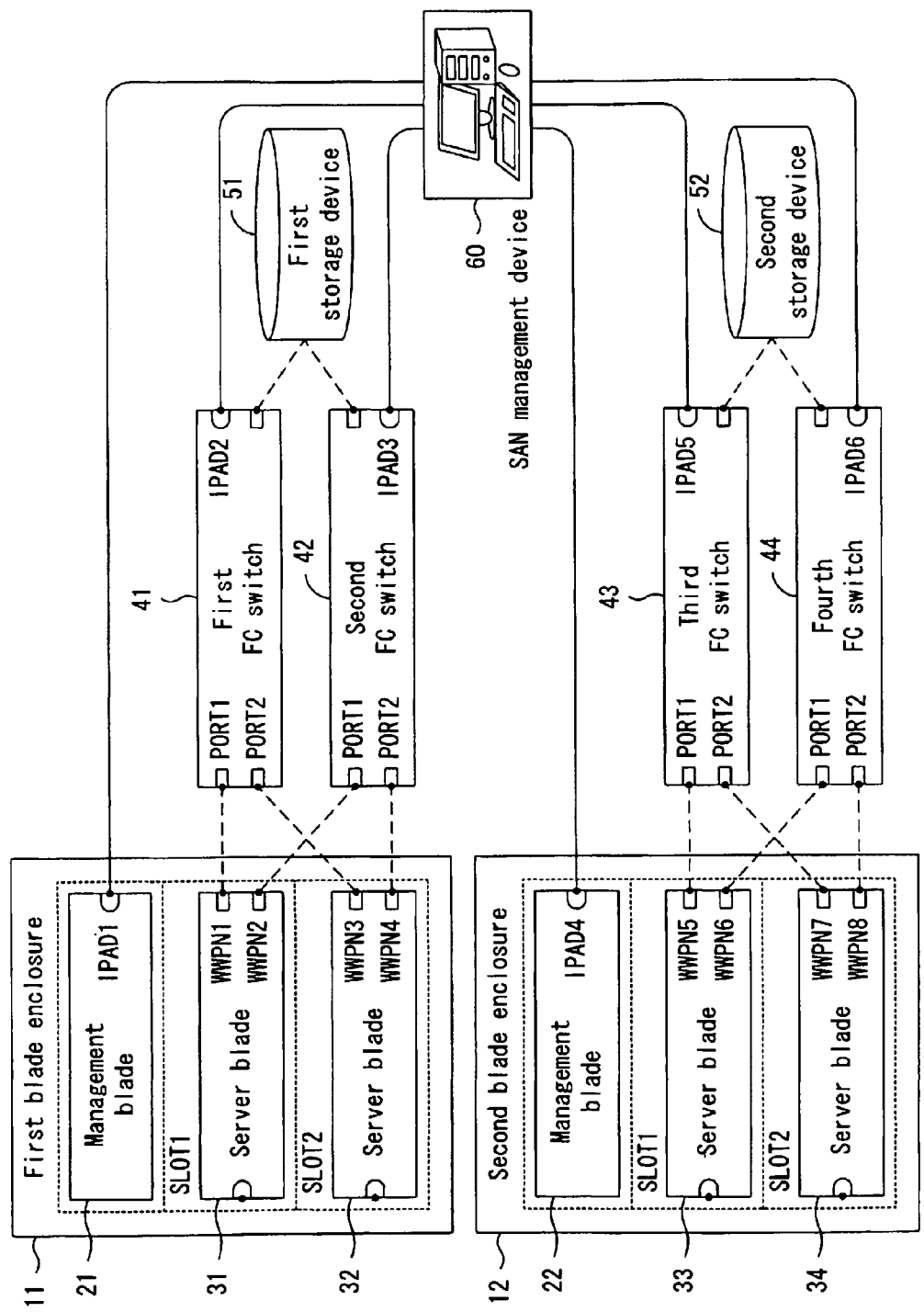

| Server blade | | | FC switch | |
|---|---|---|---|---|
| Management blade | Slot | Hardware address | IP address | Port |
| IPAD1 | SLOT1 | WWPN1 | IPAD2 | PORT1 |
| IPAD1 | SLOT1 | WWPN2 | IPAD3 | PORT1 |
| IPAD1 | SLOT2 | WWPN3 | IPAD2 | PORT2 |
| IPAD1 | SLOT2 | WWPN4 | IPAD3 | PORT2 |
| IPAD4 | SLOT1 | WWPN5 | IPAD5 | PORT1 |
| IPAD4 | SLOT1 | WWPN6 | IPAD6 | PORT1 |
| IPAD4 | SLOT2 | WWPN7 | IPAD5 | PORT2 |
| IPAD4 | SLOT2 | WWPN8 | IPAD6 | PORT2 |

FIG. 3

71: Working table

72:Working table

73:Working table

| Management blade | Slot | Power condition |
|---|---|---|
| IPAD1 | SLOT1 | ON |
| IPAD1 | SLOT2 | ON |
| IPAD4 | SLOT1 | ON |
| IPAD4 | SLOT2 | ON |

FIG. 13

74:Working table

| IP address | Port | Hardware address |
|---|---|---|
| IPAD2 | PORT1 | WWPN1 |
| IPAD3 | PORT1 | WWPN2 |
| IPAD2 | PORT2 | WWPN3 |
| IPAD3 | PORT2 | WWPN4 |
| IPAD5 | PORT1 | WWPN5 |
| IPAD6 | PORT1 | WWPN6 |
| IPAD5 | PORT2 | WWPN7 |
| IPAD6 | PORT2 | WWPN8 |

NETWORK MANAGEMENT METHOD AND NETWORK MANAGEMENT PROGRAM

BACKGROUND

The present invention relates to a network management method and a network management program for managing a network.

It is a known fact that a blade server consists of a board and a frame. The board is equipped with a CPU (Central Processing Unit), a memory, and storage as minimum compositions that are necessary to operate as a server machine. The board operates as a server by installing OS (Operating System) software and a server program into the storage. In addition, the board is called a server blade in general. On the other hand, the frame is equipped with a plurality of slots for which the server blades are attached, and provides each server blade with drive electric power and connection with a network such as a LAN (Local Area Network). In addition, the frame is called a blade enclosure or a chassis in general.

Within such a blade server, each server blade operates independently and the server blades form a plurality of server groups as a whole. When a server blade is constituted as a high-end machine, heat generation becomes large, which limits the number of server blades that are mounted in the frame. On the other hand, when a performance of a server blade is lower, heat generation becomes small, which can increase the number of server blades that are mounted in the frame. Since a web server does not require so high performance, a typical use of a blade server is a web server.

Incidentally, a blade server may include a plurality of server blades that have the same function in order to distribute a load by access from the outside over the respective server blades. For example, the function is a forms control function that stores the list data transmitted from a terminal on a network into a storage device, or a web server mentioned above.

In any case, when the same functions are added to the respective server blades in a blade server for distributing a load, each of the server blades is connected to a storage device or a network device such as a load balancer through a network switch such as a FC (Fiber Channel) switch and a switching hub.

Moreover, in order to prevent the communication obstacle resulting from cutting of a cable etc., a plurality of network switches are provided between a server blade and a storage device or between a server blade and a network device. Each of the network switches is a basic composition of a fabric and a plurality of fabrics are constructed as a network (SAN (Storage Area Network), LAN). In the network that consists of a plurality of fabrics, the ports of the network switches are connected with the server blades through cables so that each of the port numbers of the network switches of any fabrics correspond to each of the slot numbers in a one-to-one relationship. Moreover, since a table that defines the correspondences is used during the communication in the network, the connection definition table is generated by an administrator.

Conventional network management methods are disclosed in the following articles on the Internet. Tsuji Tetsuya. "Dounyumae ni shitte okitai jissenhen Tokushu: SAN dounyu jissenn tekunikku (Dai 3 kai) [Practical version that should be known before introduction. Special edition: SAN introduction practical technique (the third lecture)." IT Media company, Feb. 4, 2003.

<URL:http://www.atmarkit.co.jp/fnetwork/tokusyuu/18santec/03.html> Searched on Oct. 16, 2006.

Yoshioka Yu. "(Shokyu) Shitte okitai sutolegi no kiso saisyukai (zenhan) SAN no tokucho [(Entry-level) Basis of storage that should be known (First half). Feature of SAN]." Nikkei BP Company, Apr. 4, 2006.
<URL:http://itpro.nikkeibp.co.jp/article/COLUMN/20060328/233581/> Searched on Oct. 16, 2006.

The above-described connection definition table is generated through the following procedures. At first, an administrator connects a server blade and a management device to a network, and assigns a disk on the network to the server blade. Secondly, the administrator installs OS software and a predetermined application on the assigned disk. Thirdly, the administrator operates the application on the management device to communicate with the predetermined application installed on the server blade so that the management device grabs the information about physical connection between the server blade and the network switch. The information includes hardware addresses such as WWPN (World Wide Port Name) and MAC (Media Access Control) address, and the corresponding port numbers. Fourthly, the administrator performs these procedures for the respective slots (the respective blade servers) to that the application generates the connection definition table and stores them as a file.

Moreover, another method takes the following procedures. At first, an administrator switches on a power supply of a server blade and displays a setup of BIOS (Basic Input/Output System) on a screen to read a hardware address. Secondly, the administrator switches on the power supply of each server blade irrespective of whether the OS software has been installed or not. Then, the administrator connects a control table (control console) to a network switch and reads the port number of each port and the hardware address corresponding to the port number from the screen of the control table. Thirdly, the administrator repeats the above-mentioned second procedure for the respective slots (the respective blade servers) to deduce correspondence between a slot number and a port number. Then, the administrator generates a connection definition table manually on the management device, and stores the table as a file.

Thus, the generation of the connection definition table requires time and effort whichever method is chosen. Moreover, since the conventional methods include manual operations by the administrator, incorrect setups tend to occur.

SUMMARY

The present invention is made in view of the above-mentioned problem of the conventional methods, and the object is to provide an improved network management method, which is capable of reducing time and effort to generate a connection definition table and of avoiding incorrect settings under the condition where a plurality of server blades, storage devices, and network devices are connected through a plurality of fabrics.

A network management method of the present invention has been generated to attain the above-mentioned object. In order to manage a network that consists of a plurality of fabrics to connect server blades in a blade enclosure, storage devices, and network devices, the network management method of the present invention makes a computer execute procedures including: a reception procedure for receiving combinations each of which consists of an IP address of a management port of a management blade and an IP address of a management port of a network switch that is connected to a server blade in the blade enclosure that contains the management blade from an operator through an input device; a first acquisition procedure for acquiring a slot number and a power condition of a slot in the blade enclosure that contains the management blade identified by the IP address of each of the combinations received in the reception procedure from the identified management blade, and for storing each of the acquired slot numbers and power condition associated with the IP address of the management blade into a first table; a transmission procedure for transmitting a request to the management blade identified by the IP address of each of the received combinations so as to turn on the powers of the slots in the blade enclosure corresponding to the identified management blade through a communication device; a second acquisition procedure for acquiring a port number of a port of the network switch identified by the IP address of each of the combinations received in the reception procedure and a hardware address of a port of the server blade that is physically connected to the port of the network switch from the network switch, and for storing each of the acquired port numbers and hardware addresses associated with the IP address of the network switch into a second table; a generation procedure for reading a record corresponding to an IP address of a management blade in each of the combinations received in the reception procedure from the first table and a record corresponding to an IP address of a network switch in the combination from the second table, and for storing the read records associated with each other into a third table; and a restoration procedure for transmitting a request to the management blade identified by the IP address in each of records in the first table whose power condition represent off so as to turn off the power of the slot identified by the slot number in each of the record through the communication device.

Since the network management method is constituted as described above, with just the input of the combination of the IP addresses of the management ports of the management blades and the IP addresses of the network switches into the computer, the operator of the computer that executes the method can generate the third table that contains the slot numbers of the server blades acquired from the management blades and the corresponding port numbers acquired from the network switches. It is unnecessary to install OS software to the server blades and to read setting information based on the BIOS screen.

Therefore, the present invention is capable of reducing time and effort to generate a connection definition table and of avoiding incorrect settings under the condition where a plurality of server blades, storage devices, and network devices are connected through a plurality of fabrics.

DESCRIPTION OF THE ACCOMPANYING DRAWINGS

Figure 2:
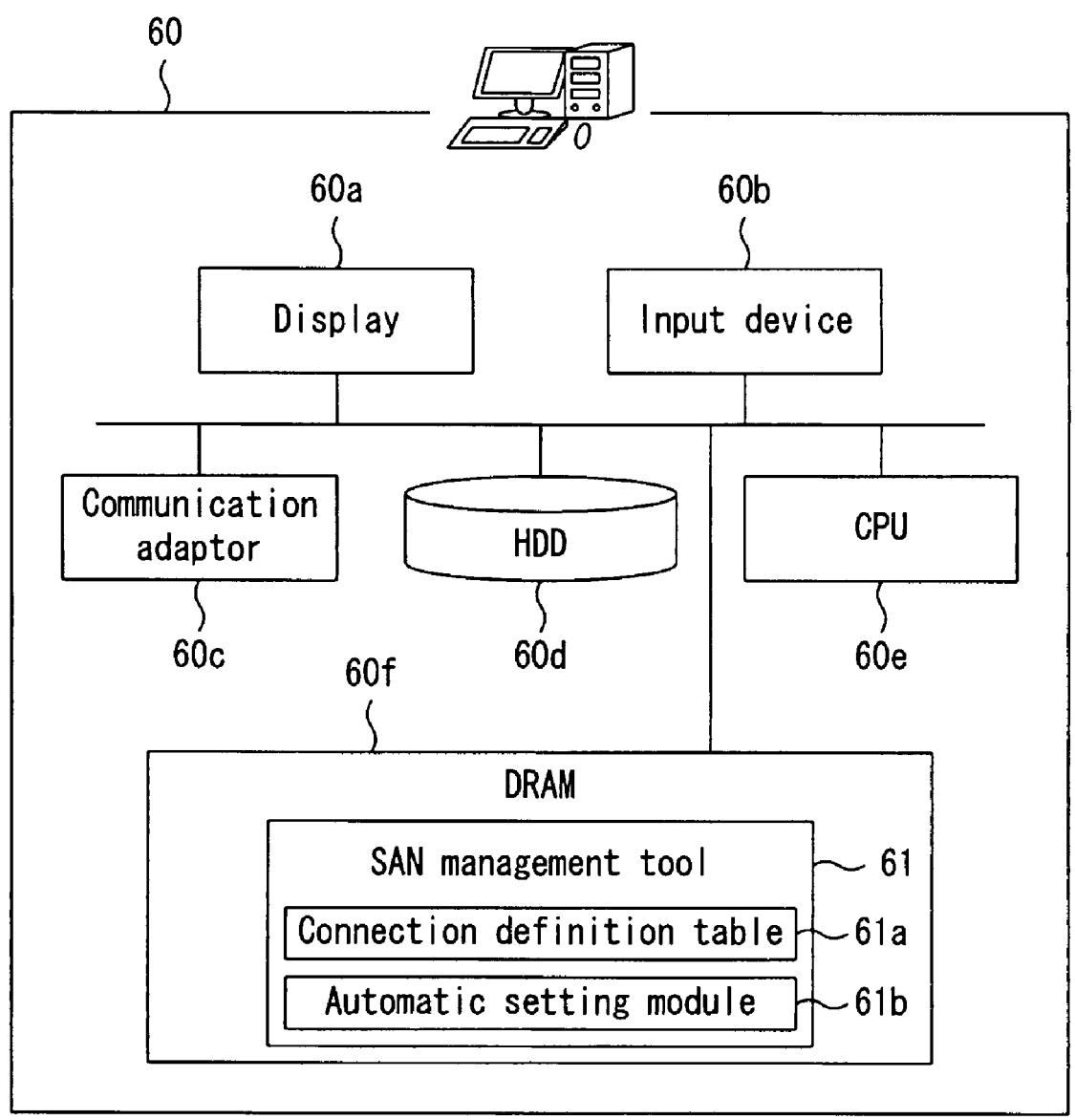
Figure 4:
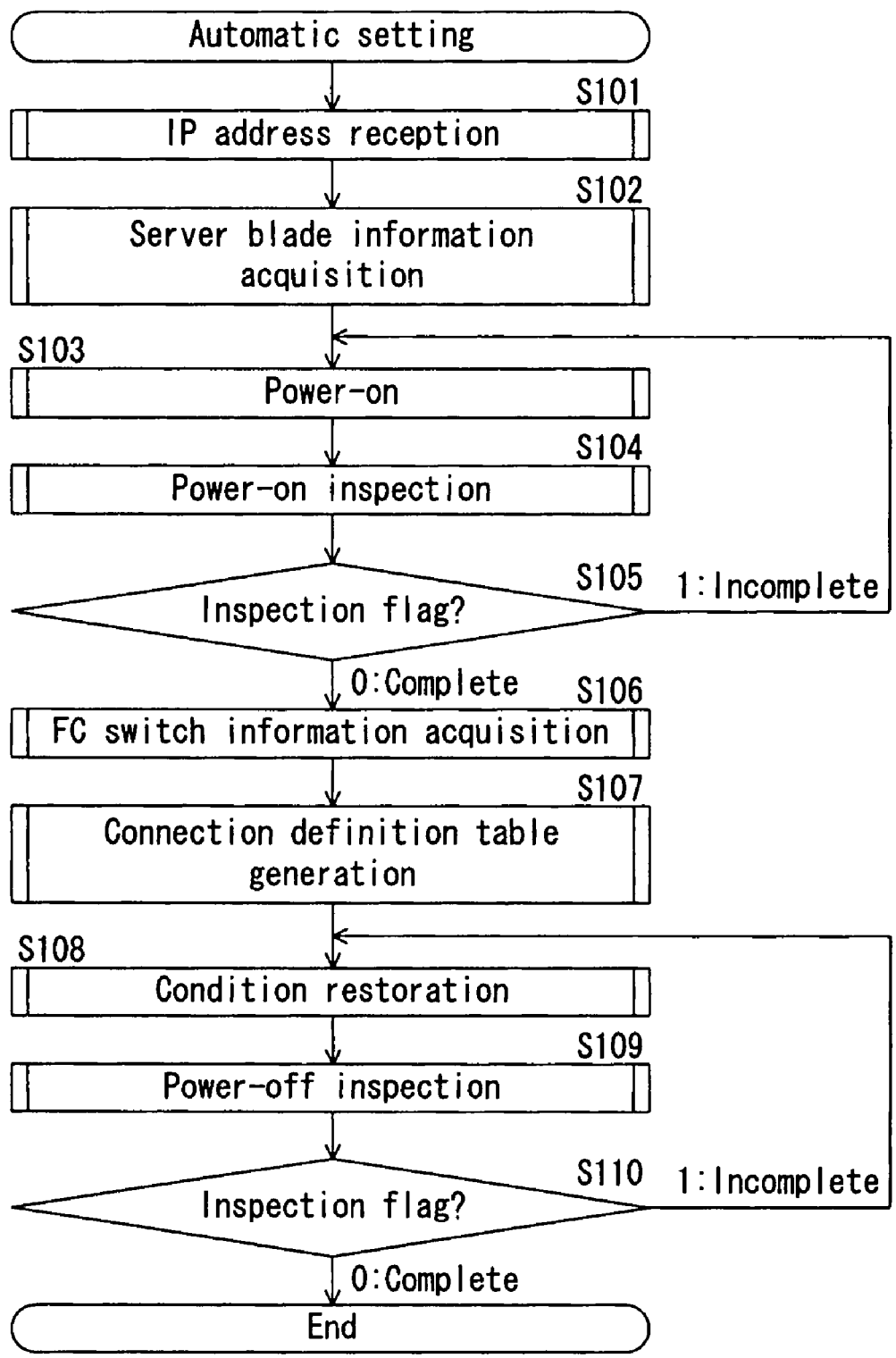
Figure 5:
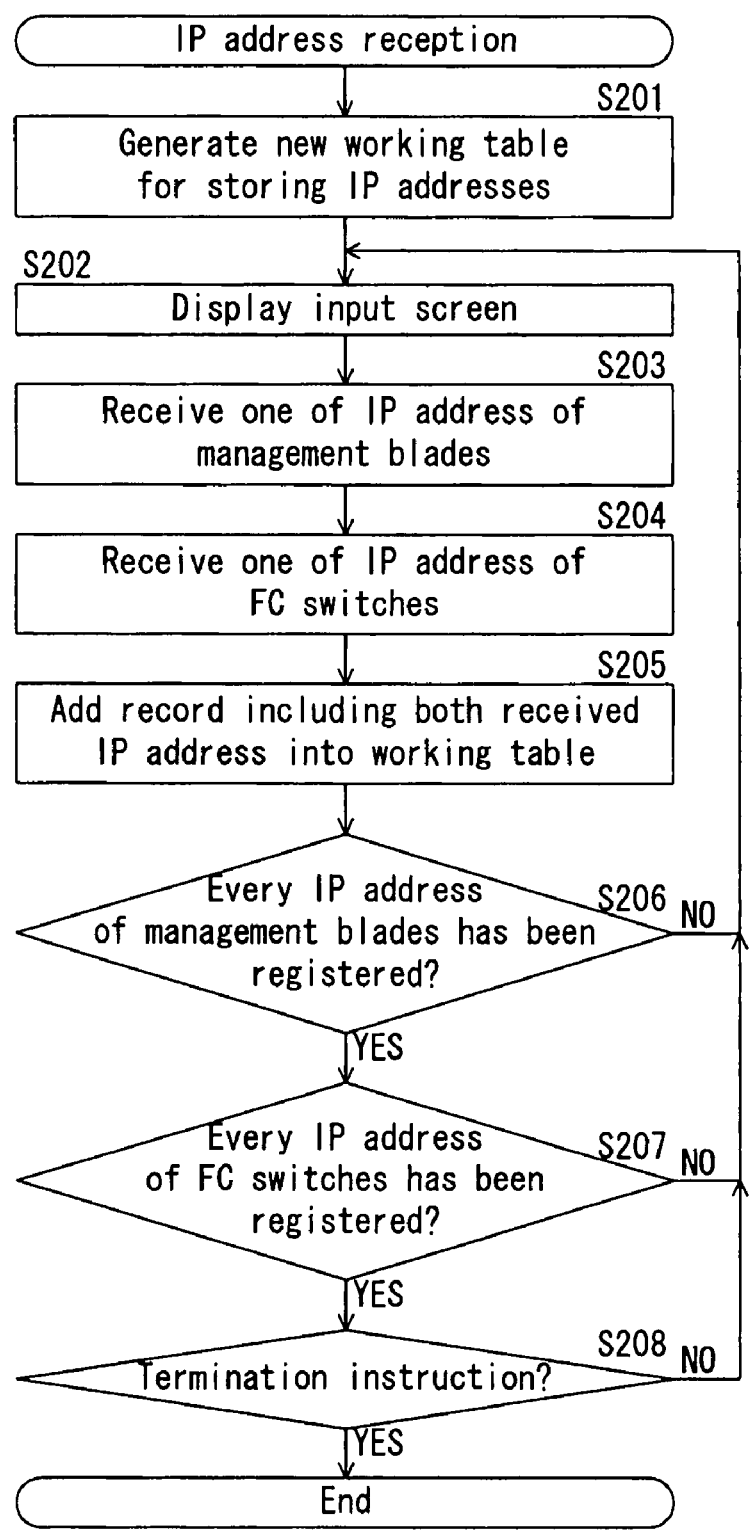
Figure 6:
Figure 7:
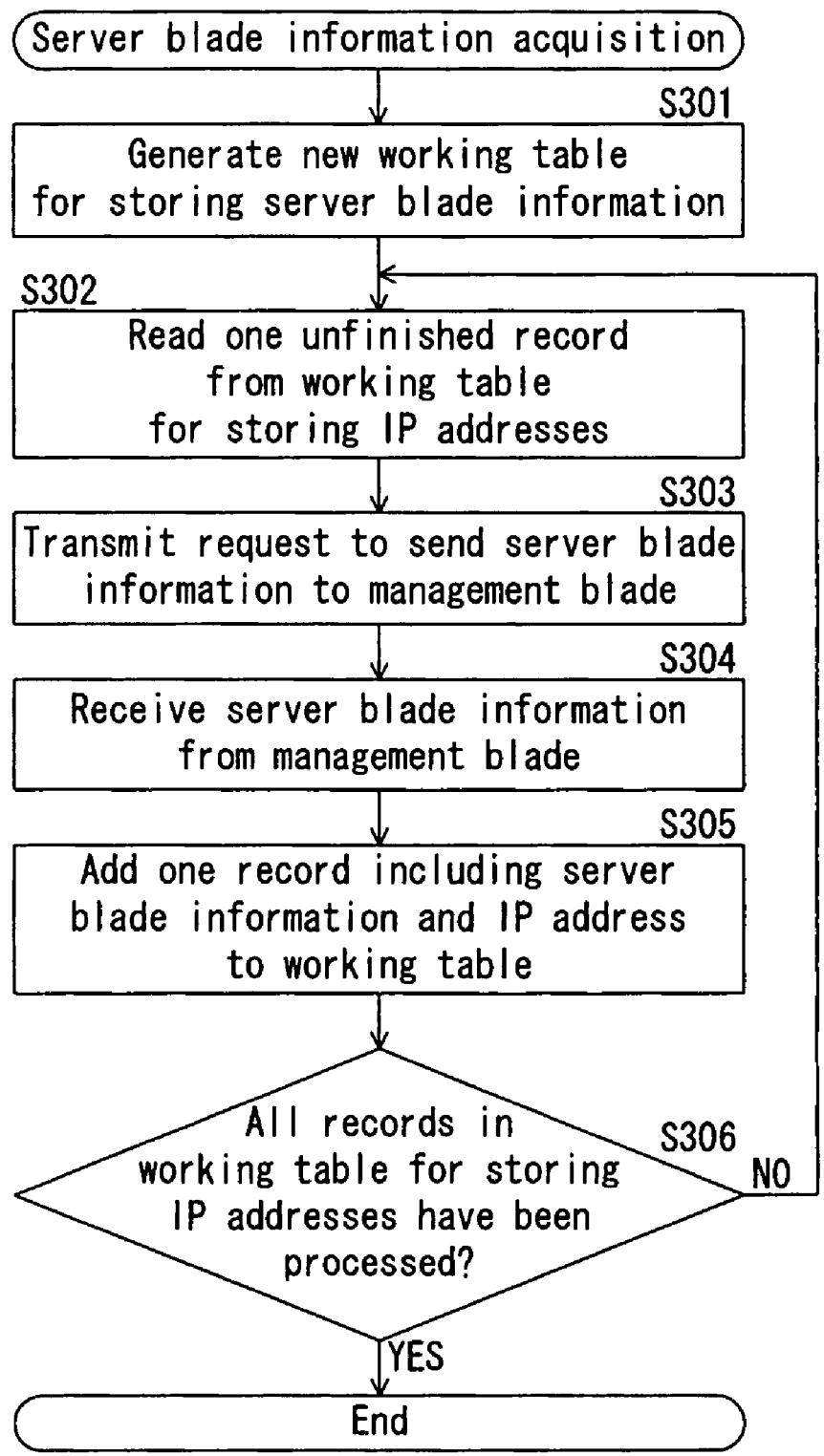
Figure 8:
Figure 9:
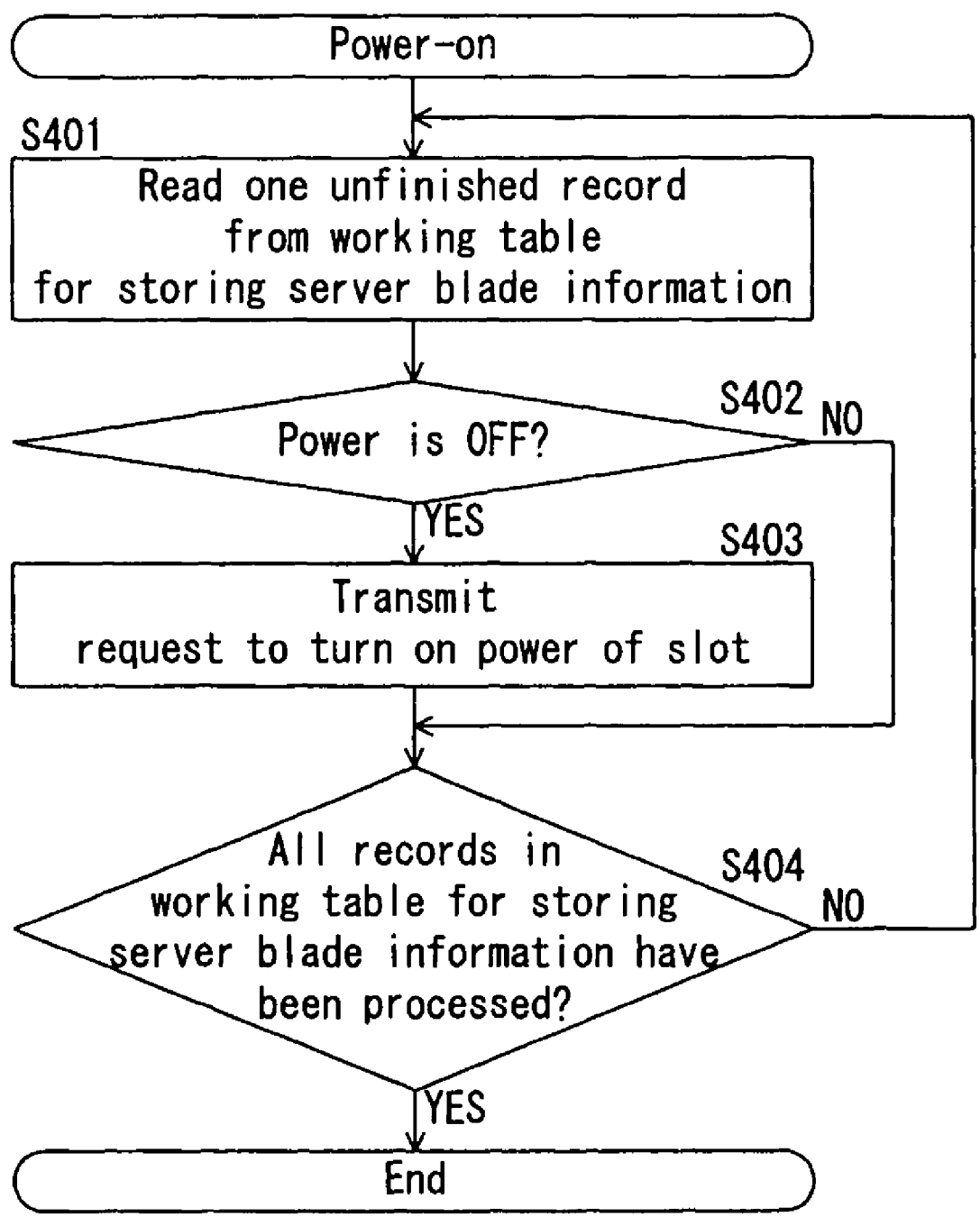
Figure 10:
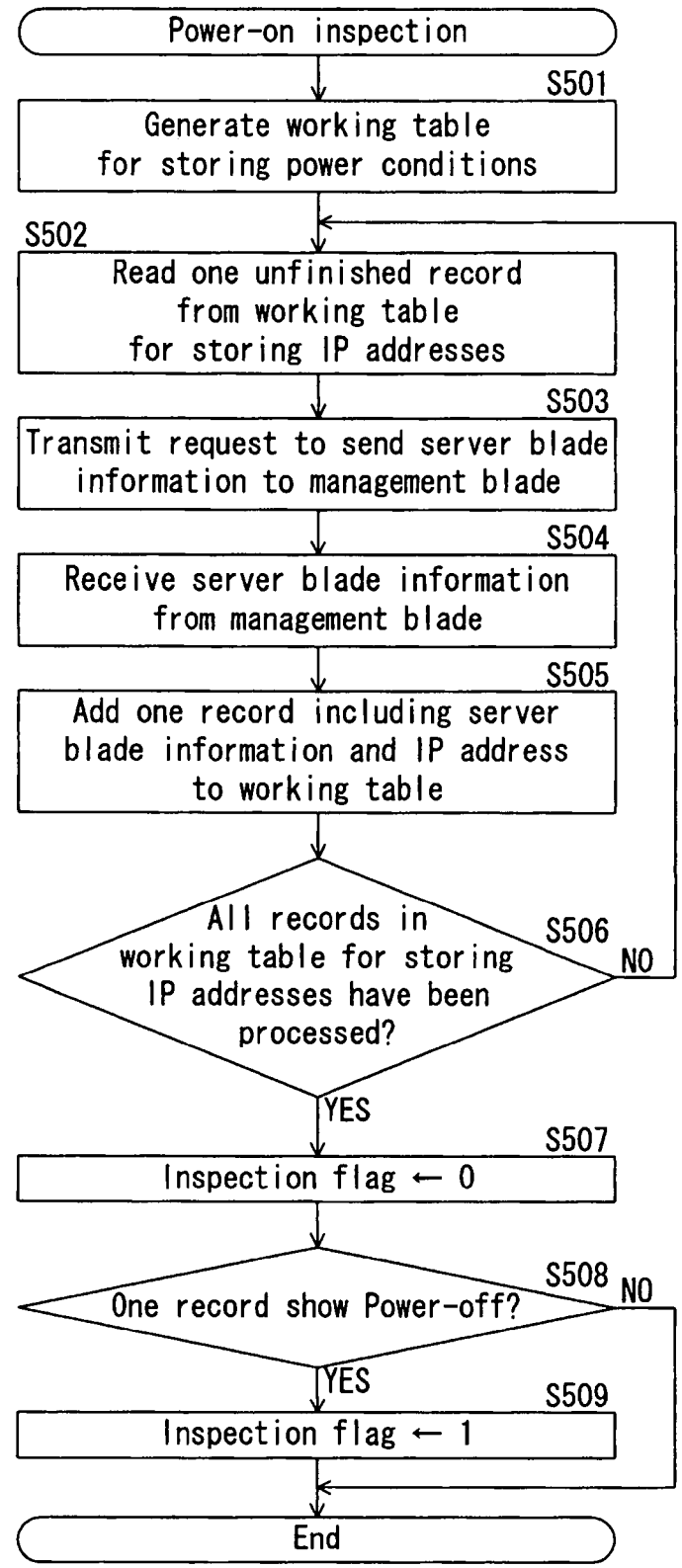
Figure 11:
Figure 12:
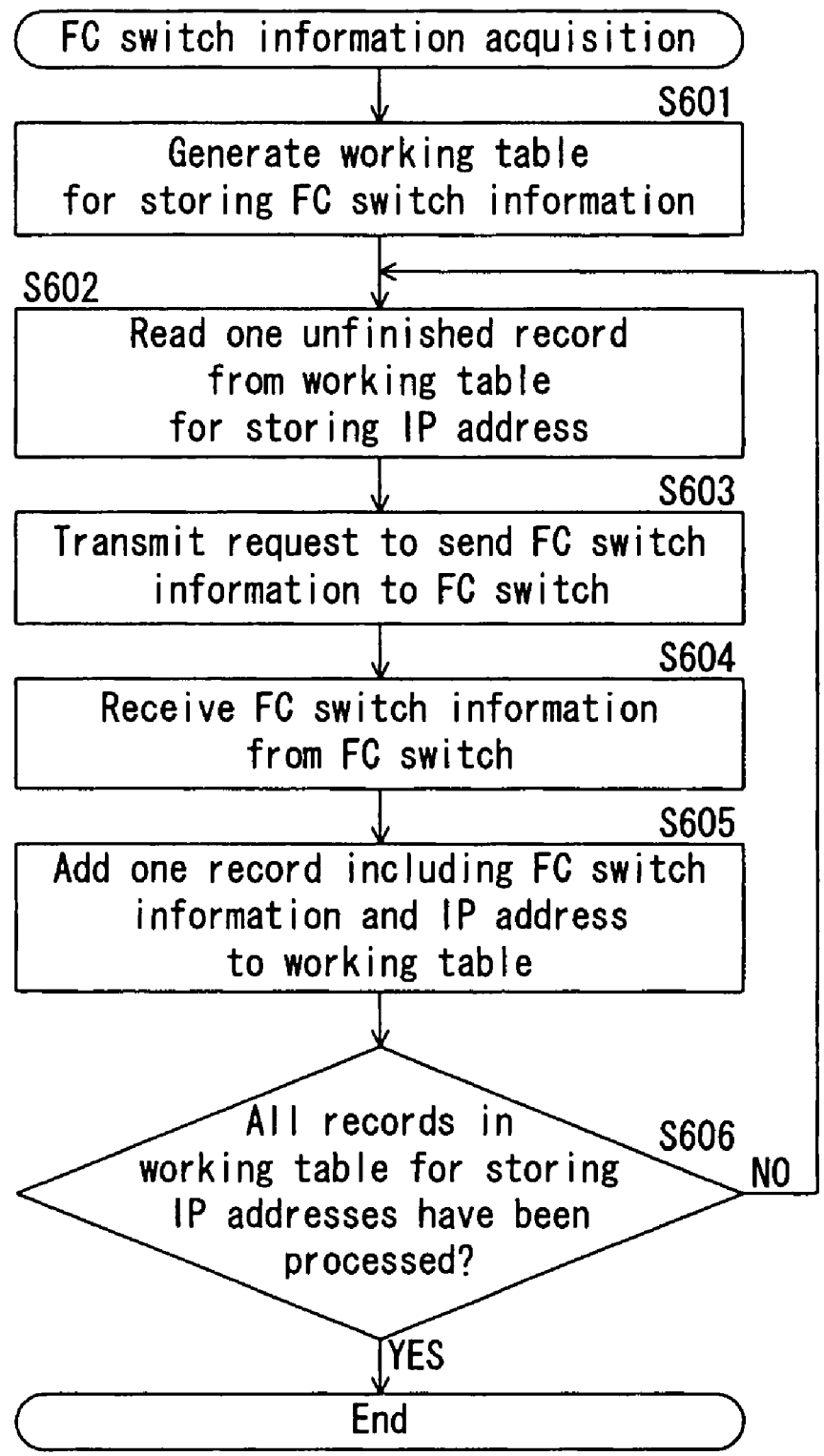
Figure 14A:
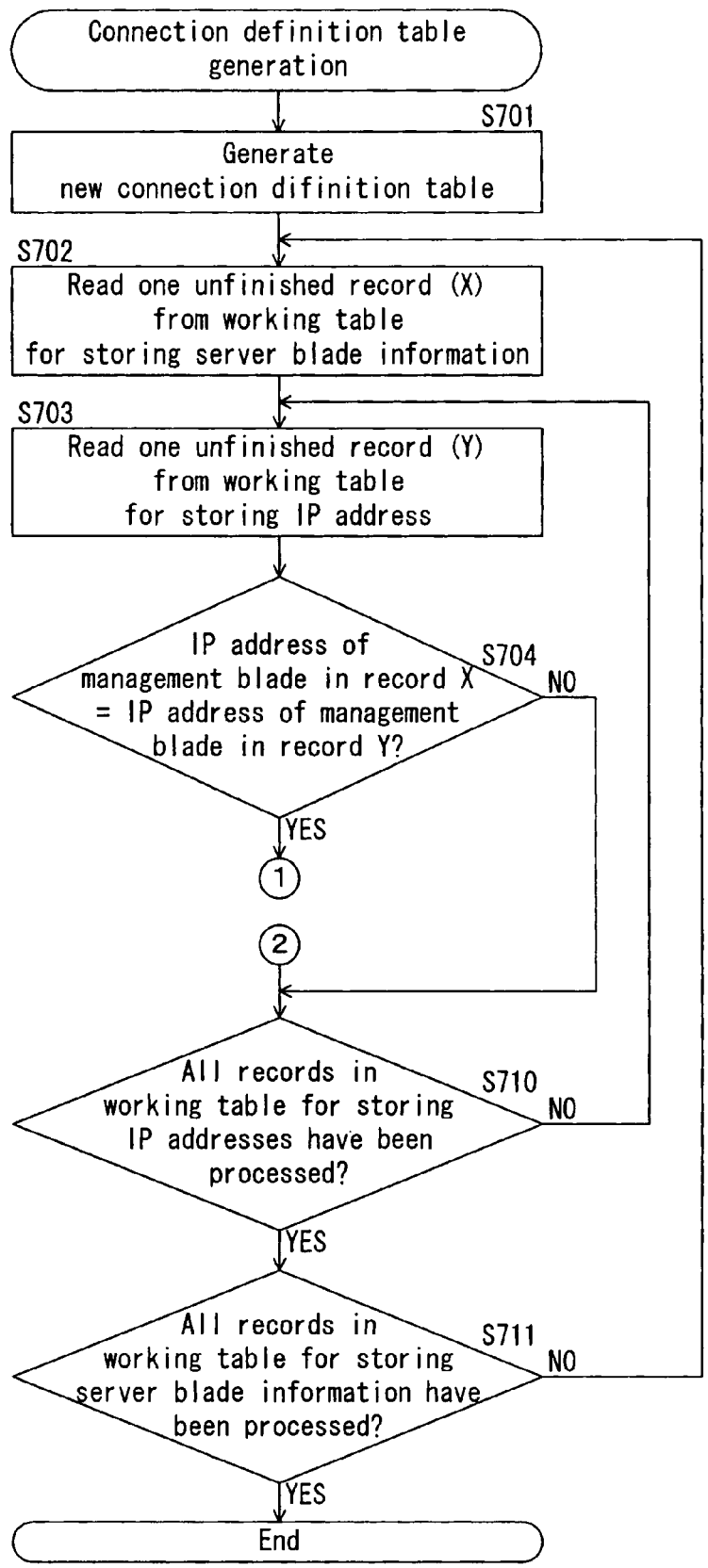
Figure 14B:
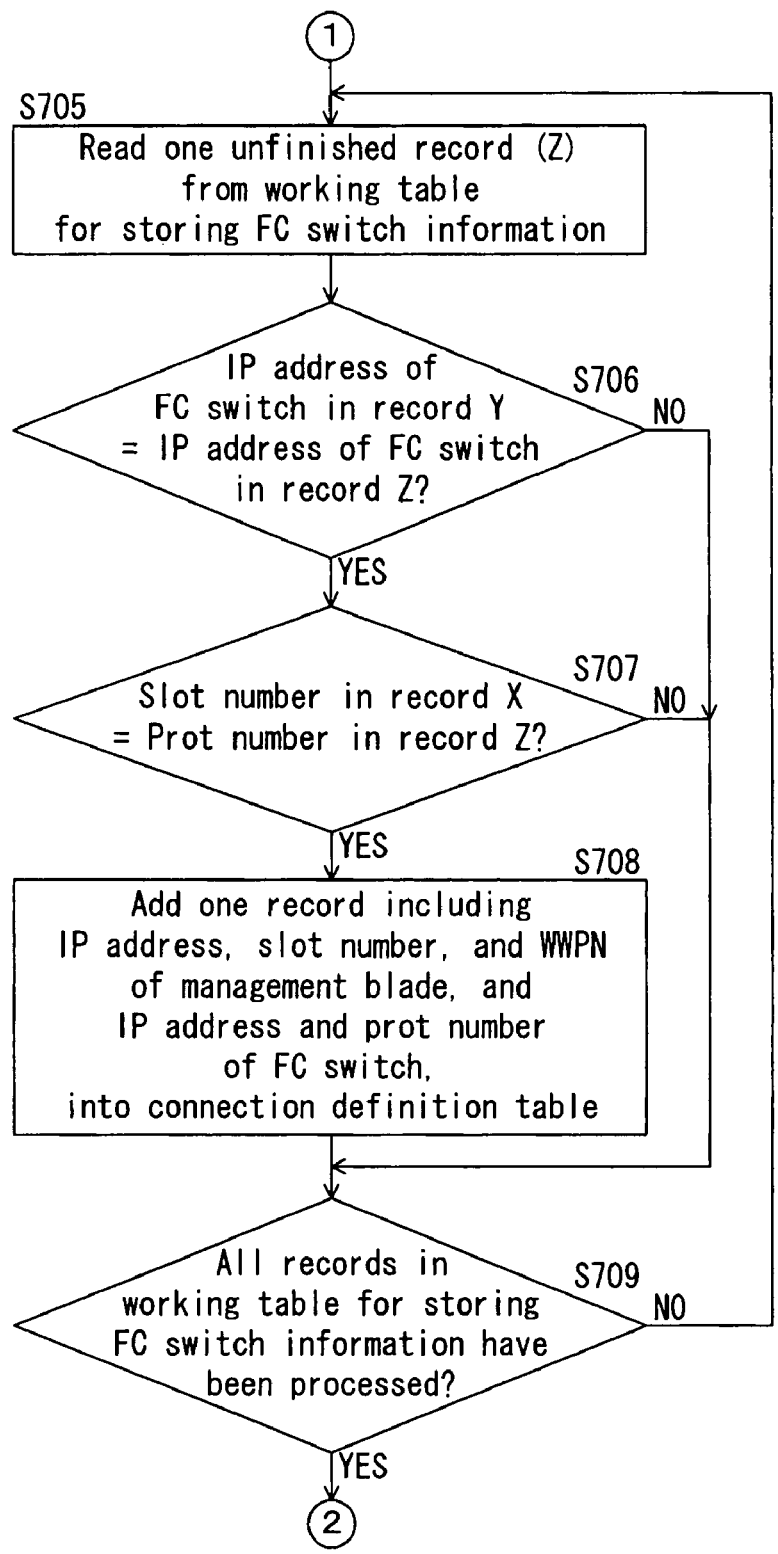
Figure 15:
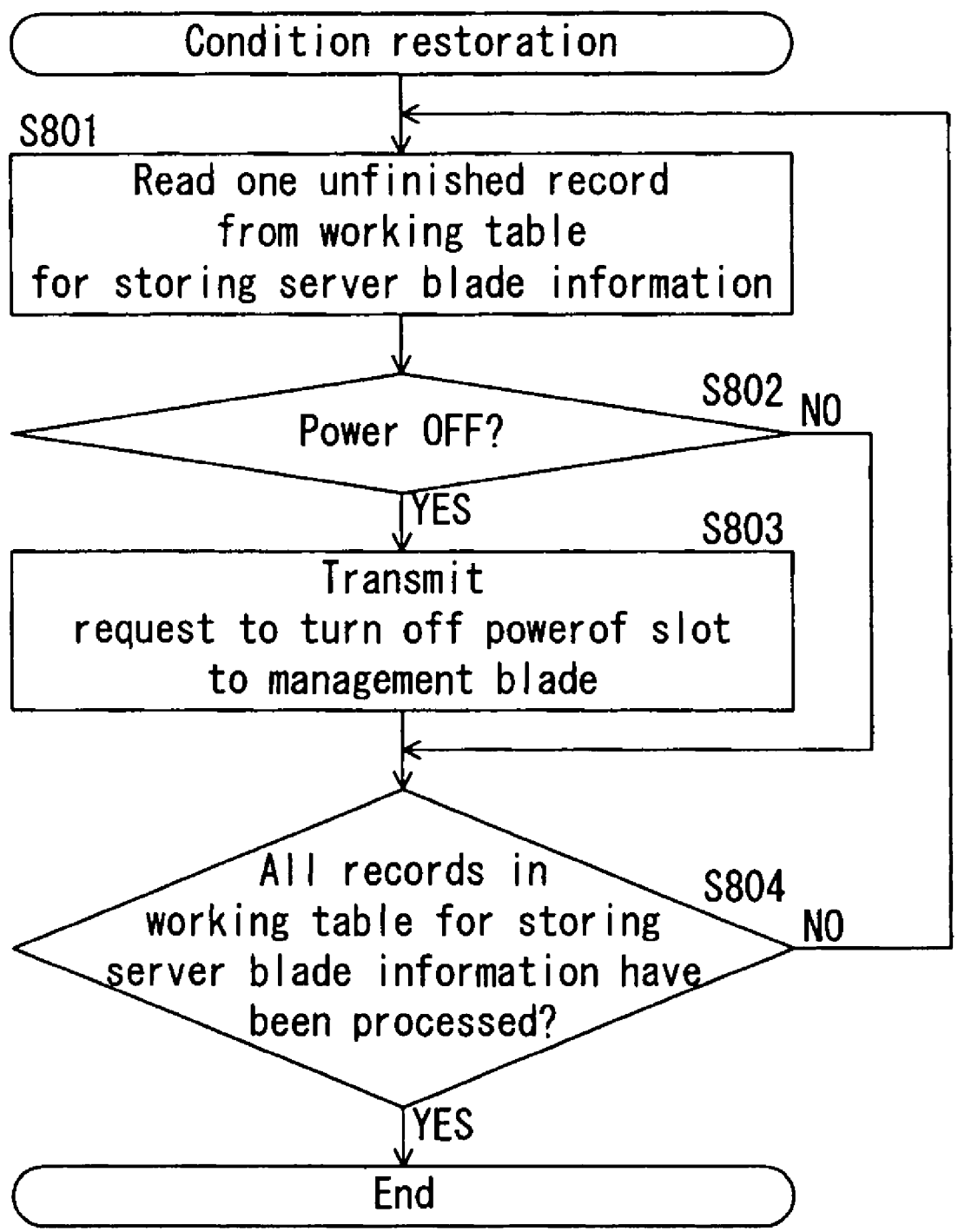
Figure 16A:
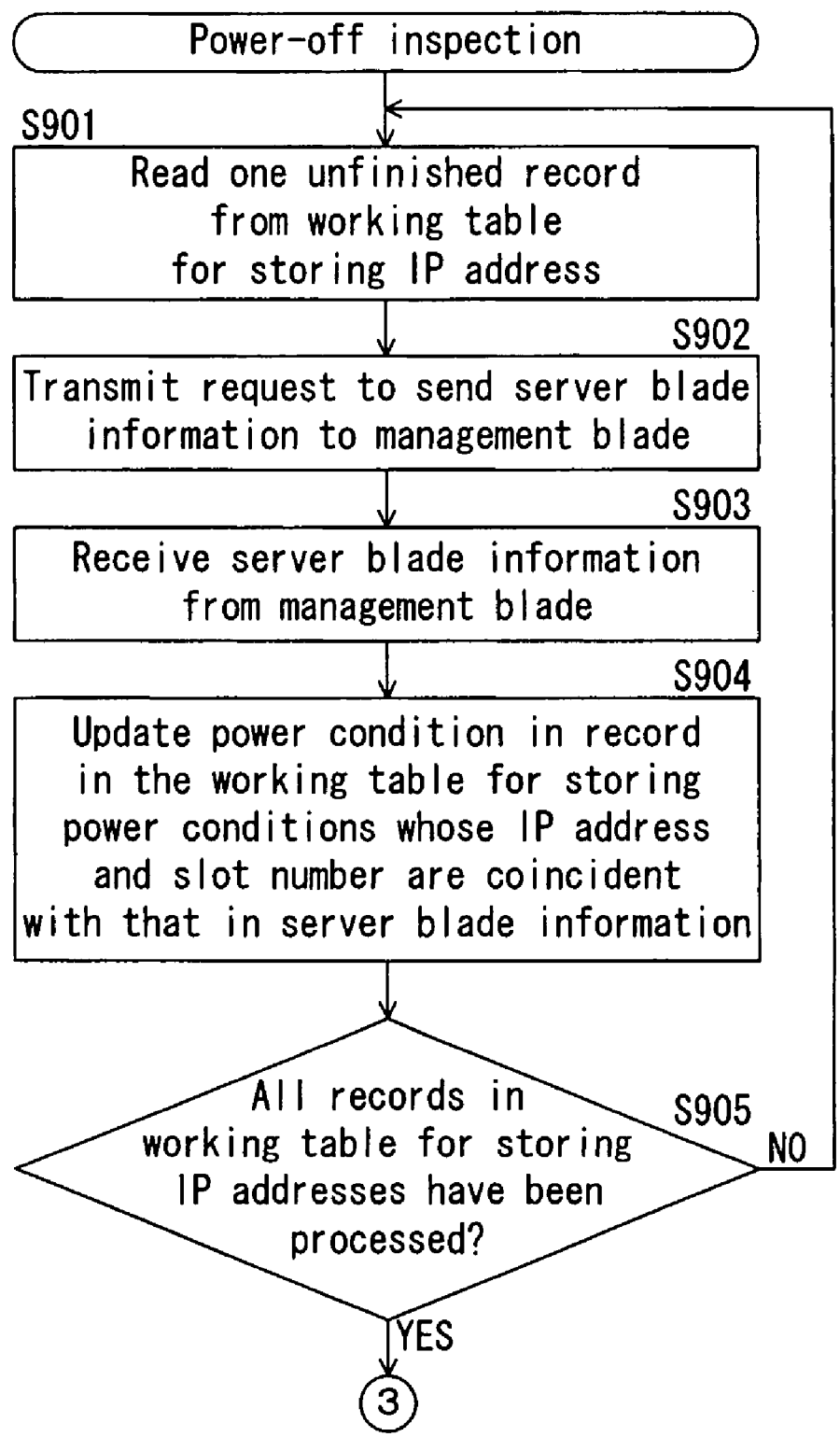
Figure 16B:
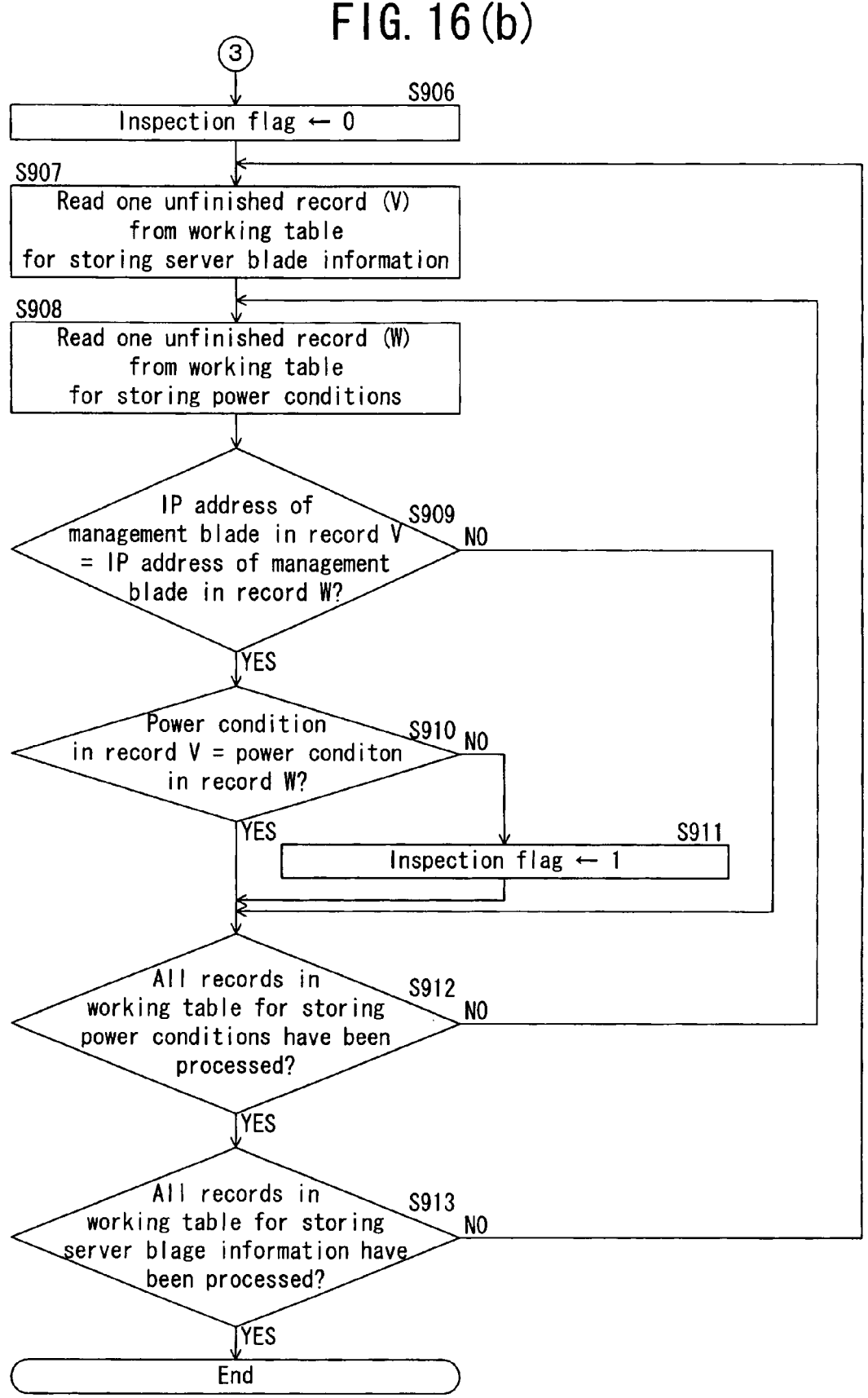
Figure 17:
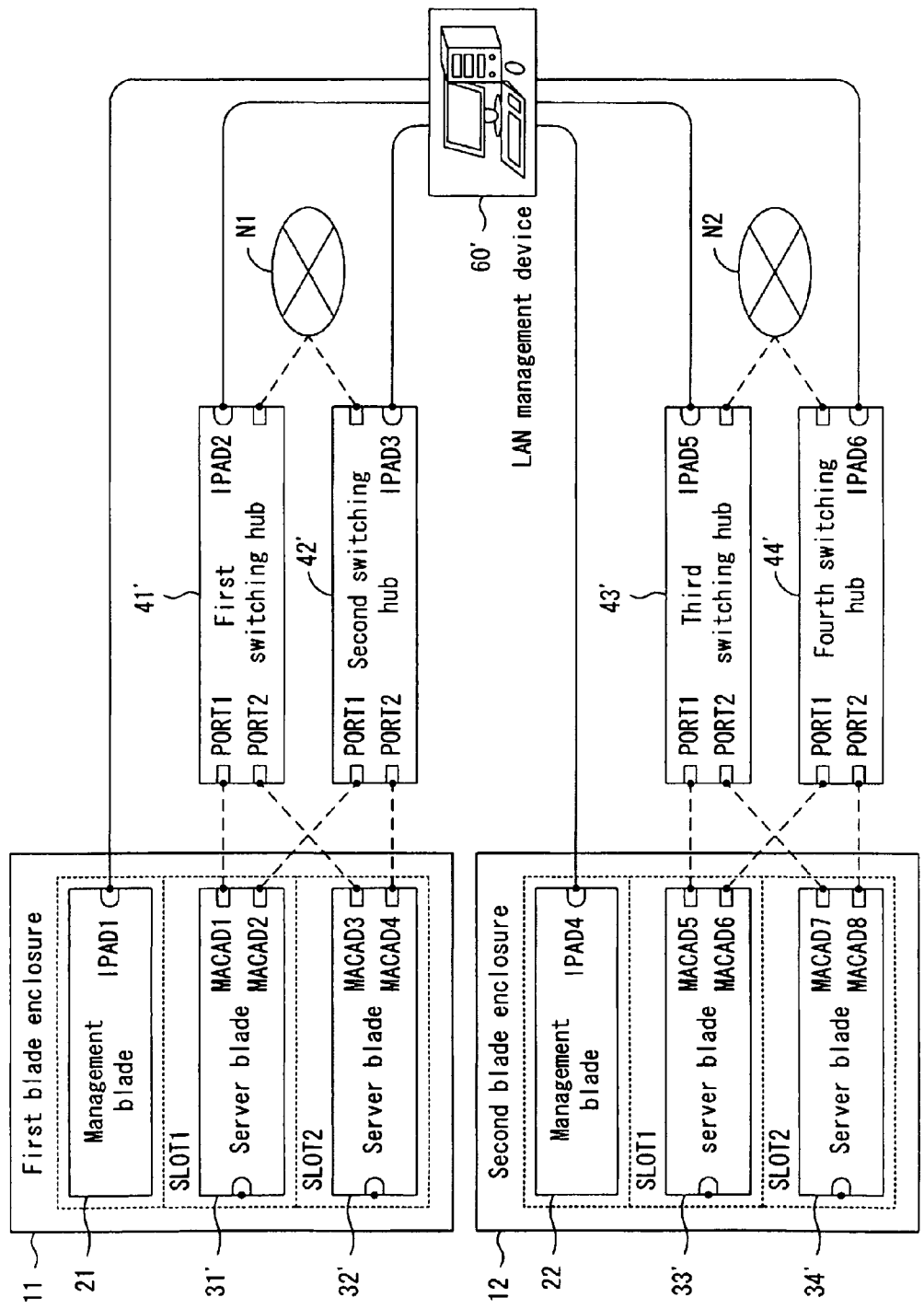
Figure 18:
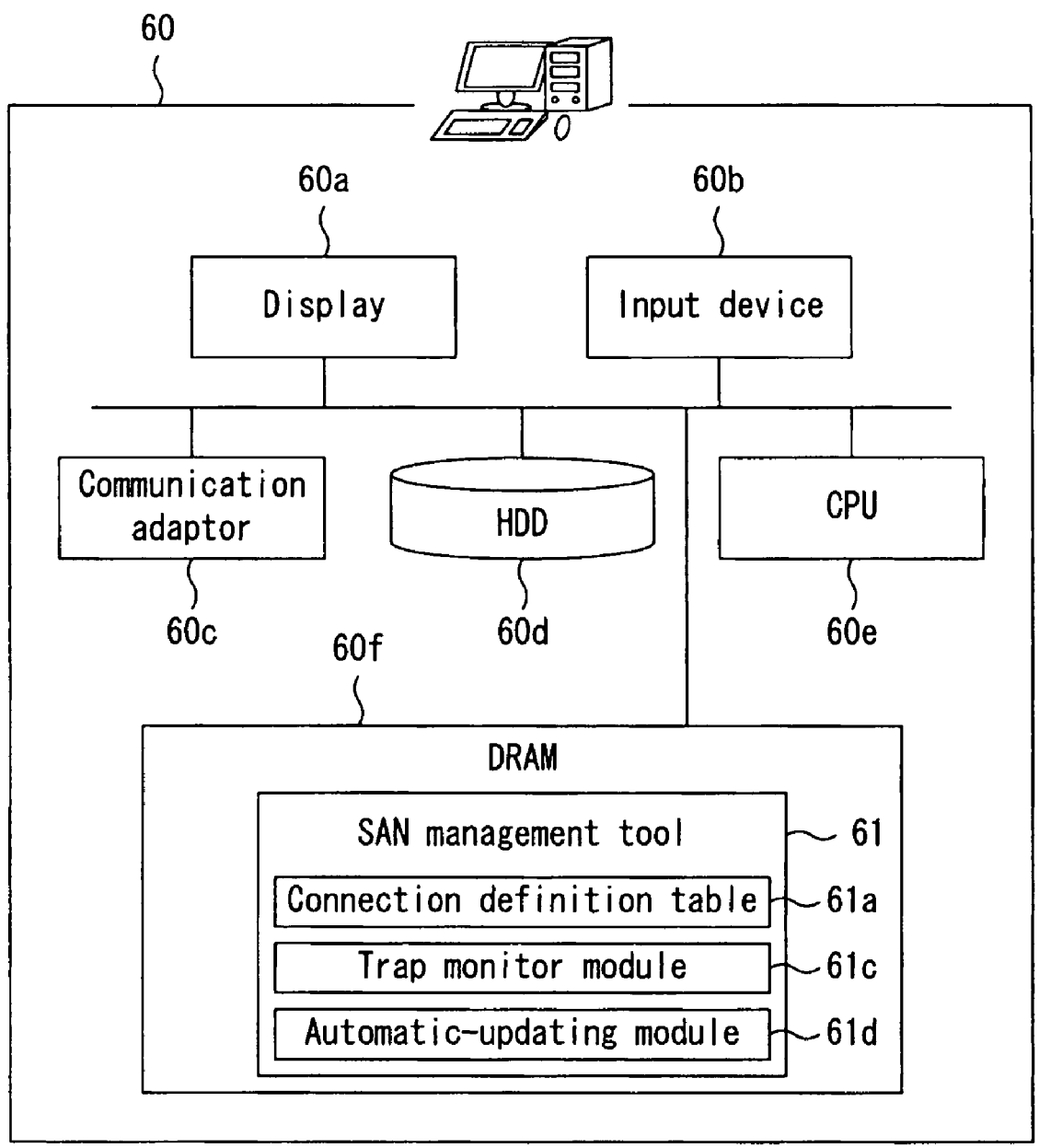
Figure 19:
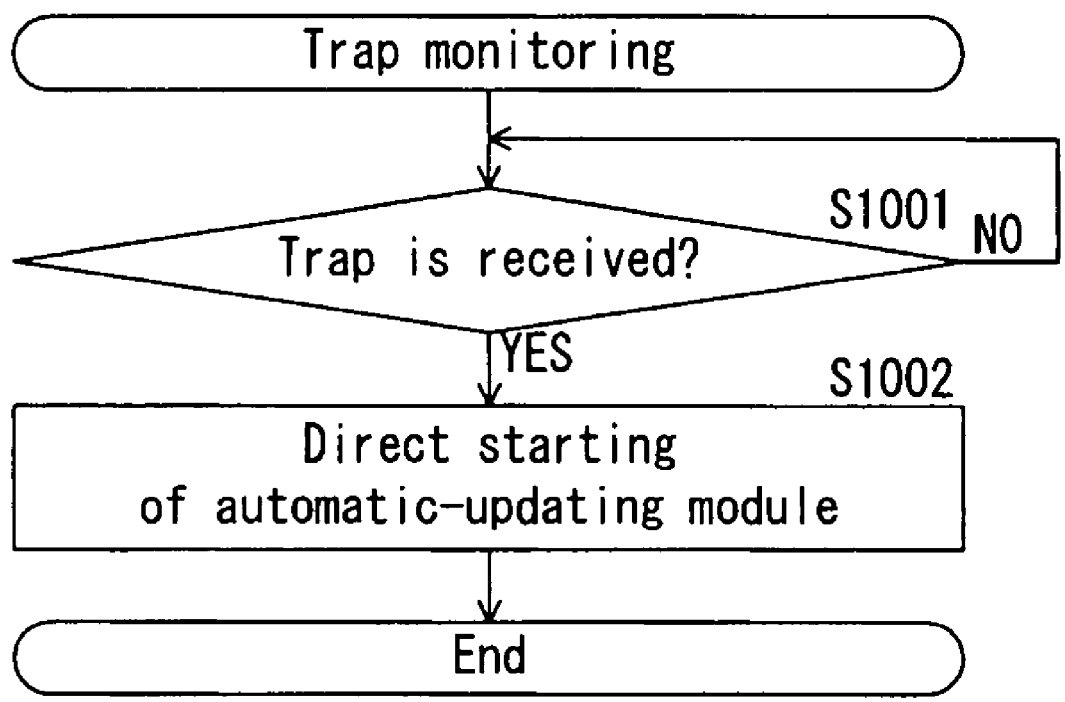
Figure 20:
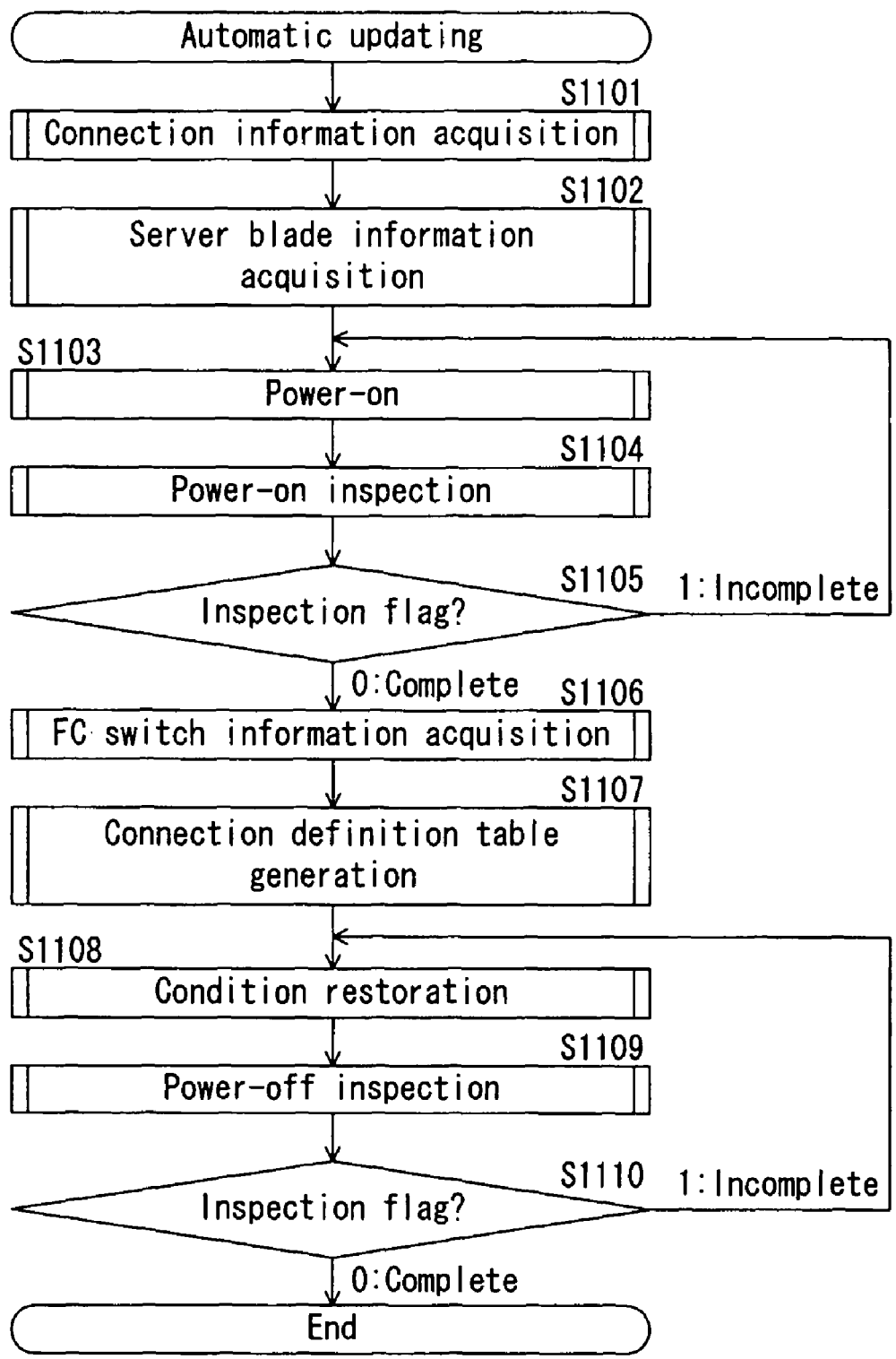
Figure 21:
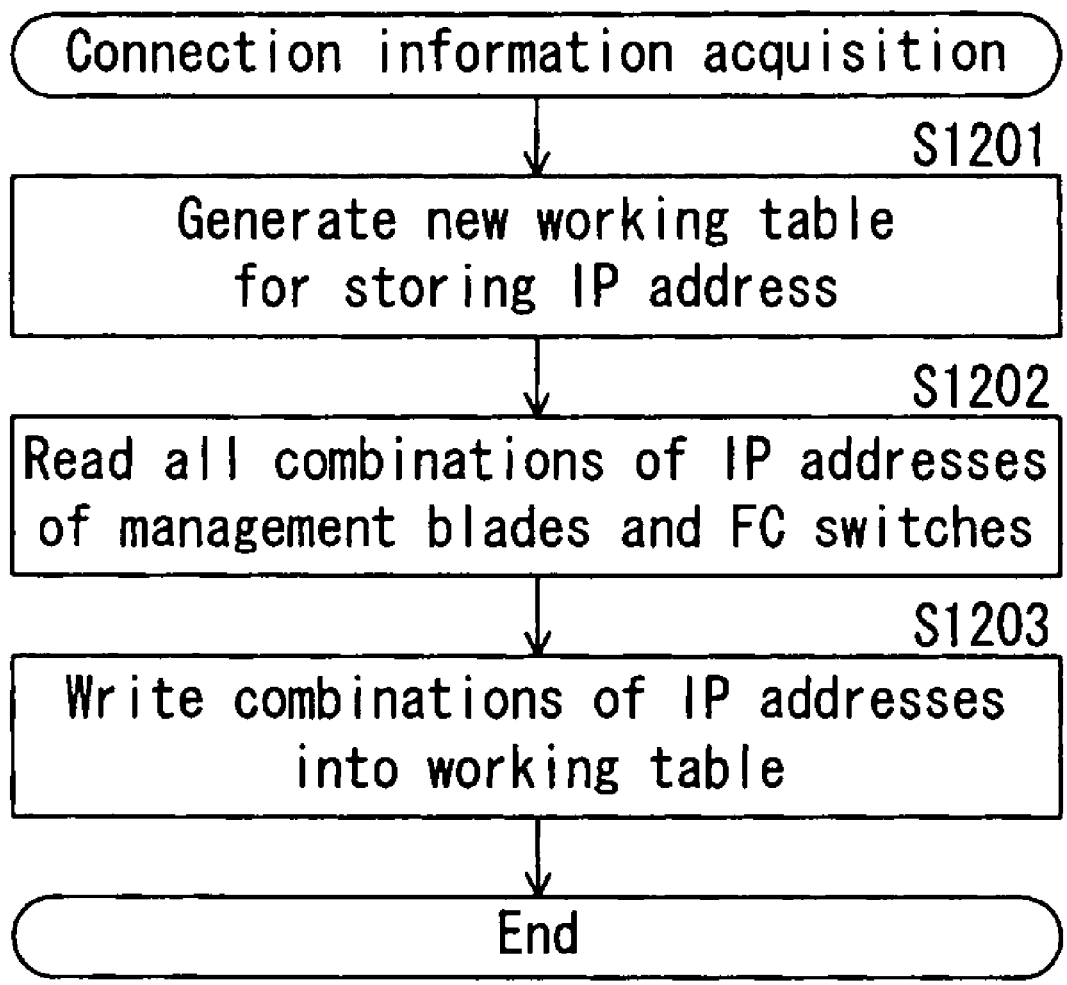
Figure 22:
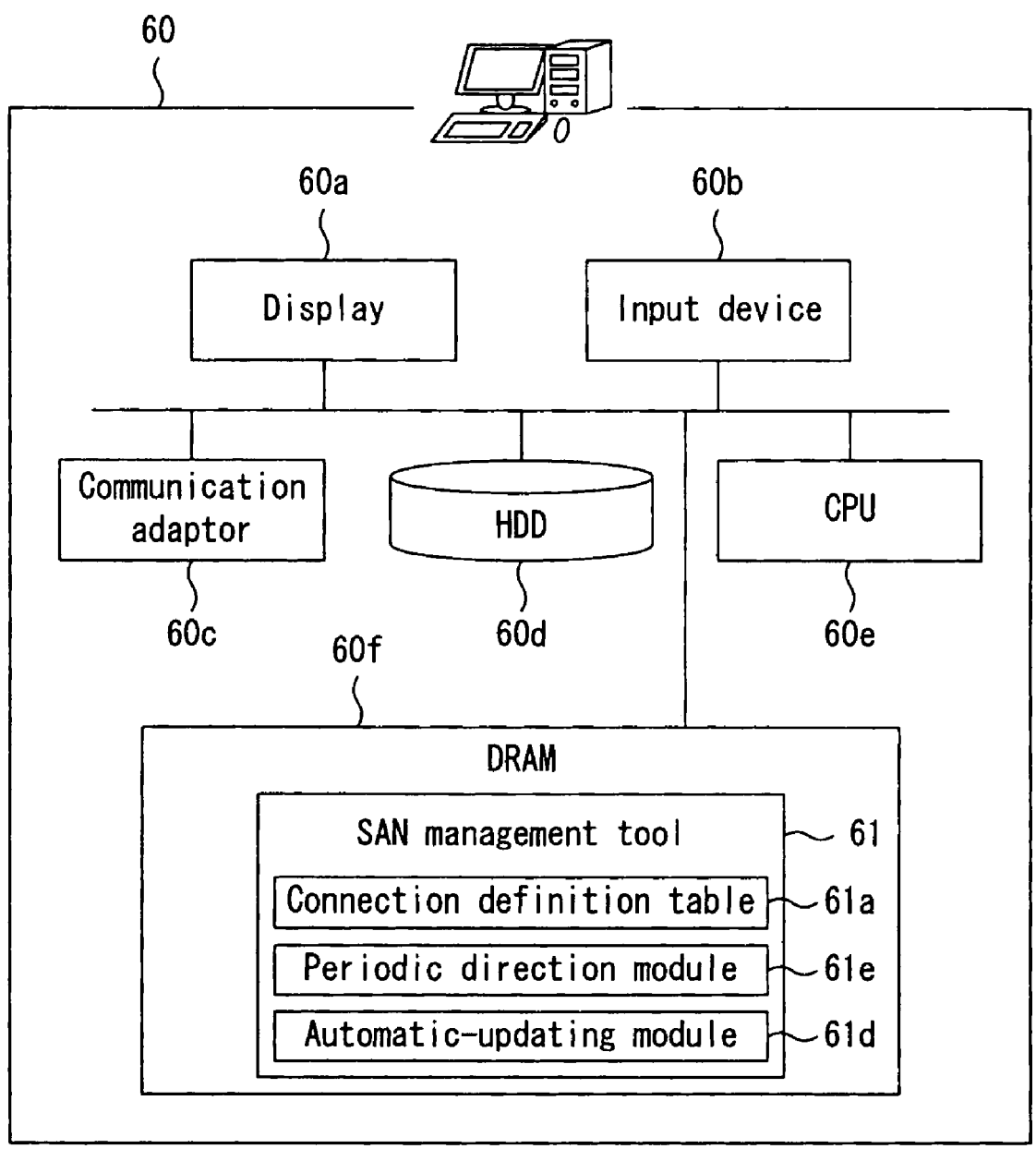
Figure 23:
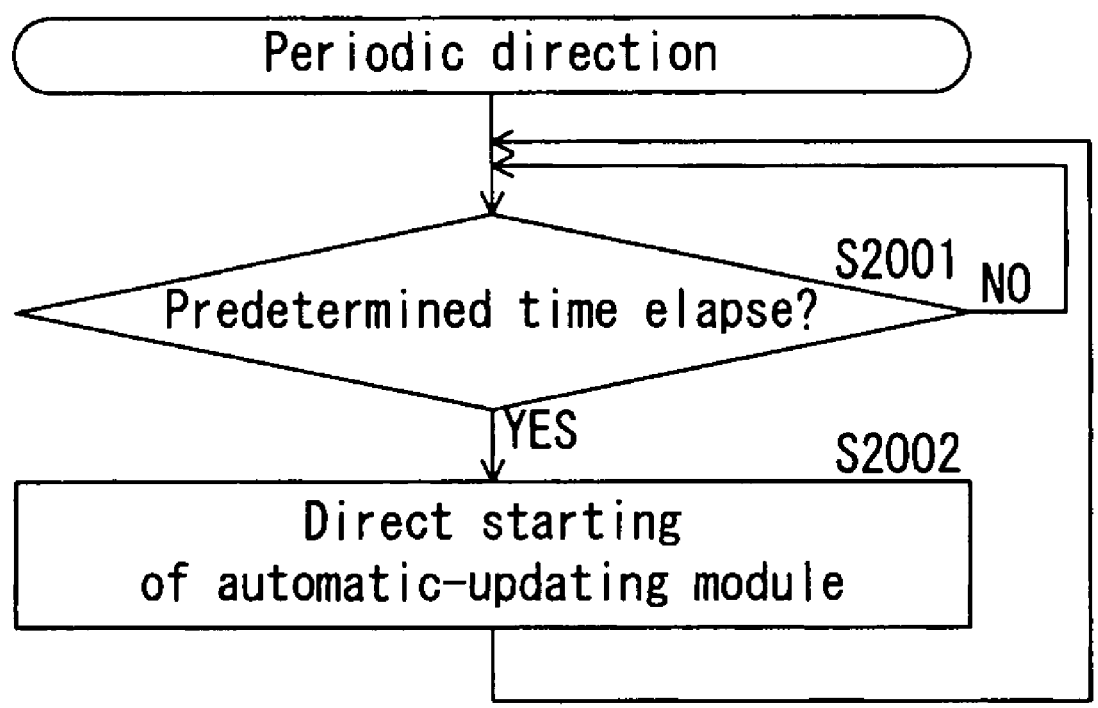

FIG. 1 is a block diagram of the computer network system of the first embodiment according to the present invention, FIG. 2 is a block diagram showing the composition of a SAN management device contained in the system of FIG. 1, FIG. 3 shows a table showing an example of a data structure of a connection definition table, FIG. 4 is a flowchart showing an automatic setting process, FIG. 5 is a flowchart showing an IP address reception subroutine, FIG. 6 shows a table showing an example of a data structure of a working table for storing IP addresses, FIG. 7 is a flowchart showing a server blade information acquisition subroutine, FIG. 8 shows a table showing an example of a data structure of a working table for storing server blade information, FIG. 9 is a flowchart showing a power-on subroutine, FIG. 10 is a flowchart which shows a power-on inspection subroutine, FIG. 11 shows a table showing an example of a data structure of the working table for storing power conditions, FIG. 12 is a flowchart showing an FC switch information acquisition subroutine, FIG. 13 shows a table showing an example of a data structure of a working table for storing FC switch information, FIG. 14(a) is a flowchart showing a first part of a connection-definition-table-generation subroutine, FIG. 14(b) is a flowchart showing a second part of the connection-definition-table-generation subroutine is shown, FIG. 15 is a flowchart showing a condition restoration subroutine, FIG. 16(a) is a flowchart showing a first part of a power-off inspection subroutine, FIG. 16(b) is a flowchart showing a second part of the power-off inspection subroutine, FIG. 17 is a block diagram showing a computer network system of a second embodiment according to the present invention, FIG. 18 is a block diagram of a SAN management device of a third embodiment according to the present invention, FIG. 19 is a flowchart showing a trap monitoring process in the third embodiment, FIG. 20 is a flowchart showing an automatic-updating process in the third embodiment, FIG. 21 is a flowchart showing a connection information acquisition subroutine in the third embodiment, FIG. 22 is a block diagram of a SAN management device of a fourth embodiment according to the present invention, and FIG. 23 is a flowchart showing a periodic direction process of the fourth embodiment.

DESCRIPTION OF THE PREFERRED EMBODIMENTS

Hereafter, two embodiments of the present invention will be described with reference to the accompanying drawings.

First Embodiment

First, a configuration of a computer network system of the first embodiment will be described.

FIG. 1 is a block diagram of the computer network system of the first embodiment.

The computer network system of the first embodiment includes two blade enclosures 11 and 12, four FC (Fiber Channel) switches 41 through 44, two storage devices 51 and 52, and an SAN (Storage Area Network) management device 60.

The blade enclosures 11 and 12 are cases for containing below-mentioned server blades 31 through 34. Each of the blade enclosures 11 and 12 is provided with a plurality of slots for holding the server blades 31 through 34, and provides driving power and connections with a network such as a LAN (Local Area Network) to the respective server blades through the slots. In the first embodiment, the server blades 31 through 34 are connected with an external network (not shown) through the blade enclosures 11 and 12.

Management blades 21 and 22 are inserted into the slots of the blade enclosures 11 and 12, respectively. The management blades 21 and 22 are control panels for monitoring and controlling a power condition, a temperature state, and an operation situation of an OS (Operating System). One management blade is mounted on one blade enclosure. Each of the management blades 21 and 22 is provided with at least one management IP (Internet Protocol) port. FIG. 1 shows an example in which an IP address "IPAD1" is assigned to the IP port of the management blade 21 in the first blade enclosure 11 and an IP address "IPAD4" is assigned to the IP ports of the management blade 22 in the second blade enclosure 12.

Each of the server blades 31 through 34, which is inserted into a slot of the blade enclosures 11 and 12, is a circuit board that is provided with a CPU (Central Processing Unit), a memory, and storage as necessary minimum compositions for functioning as a server machine. Installing OS software and a server program into storage causes a server blade to function as a server. In the first embodiment, the first and second server blades 31 and 32 are mounted on the blade enclosure 11 and the third and fourth server blades 33 and 34 are mounted on the blade enclosure 12 as shown in FIG. 1. In the example shown in FIG. 1, the first and second server blades 31 and 32 in the first blade enclosure 11 are inserted into the slots to which the slot numbers "SLOT1" and "SLOT2" are assigned, respectively. The third and fourth server blades 33 and 34 in the second blade enclosure 12 are inserted into the slots to which the slot numbers "SLOT1" and "SLOT2" are assigned, respectively.

Each of the server blades 31 through 34 is provided with two or more FC ports. In the example shown in FIG. 1, the hardware addresses "WWPN1" and "WWPN2" are assigned to the two FC ports of the first server blade 31. The hardware addresses "WWPN3" and "WWPN4" are assigned to the two FC ports of the second server blade 32. The hardware addresses "WWPN5" and "WWPN6" are assigned to the two FC ports of the third server blade 33. And the hardware addresses "WWPN7" and "WWPN8" are assigned to the two FC ports of the n in two FC ports of the 4th server blade 34.

FC switches 41 through 44 are network devices that relay packets to a plurality of FC ports. Specifically, receiving an input of a packet from a FC port, each of the FC switches 41 through 44 specifies a FC port as a destination, and relays a packet between these FC ports. The port number is assigned to each FC port of the FC switches 41 through 44. In the example shown in FIG. 1, the port numbers "PORT1", "PORT2", . . . are assigned to the respective FC ports of the FC switches 41 through 44.

One of FC ports of each of the FC switches 41 through 44 is connected to the storage device 51 or 52 via a FC cable. More specifically, the first and second FC switches 41 and 42 are connected to the first storage device 51, and the third and fourth FC switches 43 and 44 are connected to the second storage device 52. The FC cables are shown by the broken lines in FIG. 1.

Further, the FC switches 41 through 44 are connected to the server blades 31 through 34 via FC cables as shown in FIG. 1. Here, a topology of the FC cables between the FC switches 41 through 44 and the server blades 31 through 34 will be described.

In the first and second FC switches 41 and 42, the FC ports "PORT1" are connected to the server blade that is inserted into the slot "SLOT1" of the first blade enclosure 11, and the FC ports "PORT2" are connected to the server blade that is inserted into the slot "SLOT2". Thereby, the first and second FC switches 41 and 42 form a dual fabric network between the first blade enclosure 11 and the first storage device 51. The topology does not change even when two or more FC switches are connected to the first blade enclosure 11. That is, a one-to-one correspondence between a port number of an FC port and a slot number of a slot forms the fabrics of which number is the same as the number of the FC switches.

In the same manner, in the third and fourth FC switches 43 and 44, the FC ports "PORT1" are connected to the server blade that is inserted into the slot "SLOT1" of the second blade enclosure 12, and the FC ports "PORT2" are connected to the server blade that is inserted into the slot "SLOT2". Thereby, the third and fourth FC switches 43 and 44 form a dual fabric network between the second blade enclosure 12 and the second storage device 52.

Each of the FC switches 41 through 44 is provided with at least one management IP port as with the management blades 21 and 22. In the example shown in FIG. 1, the port numbers "IPAD2", "IPAD3", "IPAD5", and "IPAD6" are assigned to the respective IP ports of the FC switches 41 through 44.

FIG. 2 is a block diagram of the SAN management device 60.

The SAN management device 60 manages the network (SAN) formed in the dual fabric by the FC switches 41 through 44 mentioned above. Specifically, the SAN management device 60 is a personal computer to which an SAN management tool is installed. Therefore, the SAN management device 60 consists of a liquid crystal display 60a, an input device 60b including a keyboard and a mouse, and a main unit to which these devices are connected. The main unit contains a communication adapter 60c, a HDD (Hard Disk Drive) 60d, a CPU 60e, and a DRAM (Dynamic Random Access Memory) 60f. The communication adapter 60c is a communication device that swaps data with other computers on the network. The HDD 60d is nonvolatile storage for storing various kinds of programs and data. The CPU 60e is a processing unit that executes processes according to the programs stored in the HDD 60d. The DRAM 60f is volatile storage to which the program is cached or a working area is developed, when the CPU 60e executes processes.

The SAN management tool software 61 is installed into the HDD 60d of the SAN management device 60. However, FIG. 2 shows a condition where the SAN management tool software 61 that is read from HDD 60d is developed on the DRAM 60f. The SAN management tool software 61 adds a SAN management tool to a personal computer. The SAN management tool manages physical connecting states and logical connecting states among respective computers in the network (SAN), and executes various operations about the network such as obstacle correspondence, a capacity addition, and a setting variation. The SAN management tool software 61 contains a connection definition table 61a and an automatic setting modular program 61b.

FIG. 3 shows a table showing an example of a data structure of the connection definition table 61a.

As shown in FIG. 3, the connection definition table 61a has records as many as combinations of the server blades 31 through 34 and the FC switches 41 through 44. In the first embodiment, since there are 2×2 combinations for each of the first and second blade enclosures 11 and 12, the connection definition table 61a has eight records at all. Each record has fields of a "server blade" and an "FC switch". The "server blade" field is divided into the subfields of a "management blade", a "slot", and a "hardware address" The "FC switch" field is divided into the subfields of an "IP address" and a "port".

The "management blade" subfield stores an IP address of a management IP port of the management blades 21 and 22. The "slot" subfield stores a slot number of a slot of the server blades 31 through 34. The "hardware address" subfield stores a WWPN (World Wide Port Name) that is a hardware address of an FC port of the server blades 31 through 34. The "IP address" subfield stores an IP address of a management IP port of the FC switches 41 through 44. The "port" subfield stores a port number of an FC port of the FC switches 41 through 44.

The automatic setting modular program 61b is a modular program for creating the connection definition table 61a shown in FIG. 3. The contents of the process that is executed by the CPU 60e according to the automatic setting modular program 61b will be described later.

The SAN management device 60 is connected to the management blades 21 and 22, and the first through fourth FC switches 41 through 44 via LAN cables as shown in FIG. 1. The LAN cables connect the communication adapter 60c with the IP ports.

Next, a process to generate the connection definition table 61a of FIG. 3 using the automatic setting modular program 61b is described.

First, a network (SAN) administrator physically connects the first and second server blades 31 and 32 to the first storage devices 51 using the first and second FC switches 41 and 42 and the FC cables in a dual fabric state, as shown in FIG. 1. Similarly, the administrator physically connects the third and fourth server blades 33 and 34 to the second storage devices 52 using the third and fourth FC switches 43 and 44 and the FC cables in a dual fabric state. Then, the administrator connects the management blades 21 and 22 and the first through fourth FC switches 41 through 44 to the SAN management device 60. After finishing the above physical connection, the administrator starts the automatic setting modular program 61b through operations of the input device 60b of the SAN management device 60. Then, an automatic setting process starts.

FIG. 4 is a flowchart showing the automatic setting process.

In the first step S101 of the automatic setting process, the CPU 60e executes an IP address reception subroutine.

FIG. 5 is a flowchart showing the IP address reception subroutine.

In the first step S201 of the IP address reception subroutine, the CPU 60e generates a working table 71 for storing a pair of below-mentioned IP addresses on the DRAM 60f.

FIG. 6 shows an example of the data structure of the working table 71.

As shown in FIG. 6, a record of the working table 71 for storing IP addresses has fields of a "management blade" and an "FC switch". The "management blade" field stores an IP address of a management IP port of the management blades 21 and 22. The "FC switch" field stores an IP address of a management IP port of the FC switches 41 through 44.

In step S201 of FIG. 5, the CPU 60e generates a new working table 71 having no record on DRAM 60f, and then, advances the process to step S202.

In step S202, the CPU 60e displays an input screen on the display 60a. The input screen (not shown) contains two drop-down list boxes. The first drop-down list box is prepared for inputting one IP address chosen from the list of all the IP addresses of the management blades 21 and 22. The second drop-down list box is prepared for inputting one IP address chosen from the list of all the IP addresses of the FC switches 41 through 44.

In the next step S203, the CPU 60e receives one of IP addresses of the management blades 21 and 22 that is inputted by the first drop-down list box of the input screen (not shown).

In the next step S204, the CPU 60e receives one of IP addresses of the FC switches 41 through 44 that is inputted by the second drop-down list box of the input screen (not shown).

In the next step S205, the CPU 60e registers a record including the IP addresses, which are inputted by the first and second drop-down list boxes, into the working table of FIG. 6.

In the next step S206, the CPU 60e determines whether every IP address of the management blades 21 and 22 has been registered into the working table 71 of FIG. 6. That is, the CPU 60e determines whether there is an IP address that has not been registered into the working table 71 among the IP addresses of the management blades 21 and 22. When there is an IP address of the management blades 21 and 22 that has not been registered into the working table 71 of FIG. 6, the CPU 60e branches the process from step S206, and returns it to step S202. On the other hand, when every IP address of the management blades 21 and 22 has been registered into the working table 71 of FIG. 6 at least once, the CPU 60e advances the process to step S207.

In step S207, the CPU 60e determines whether every IP address of the FC switches 41 through 44 has been registered into the working table 71 of FIG. 6. That is, the CPU 60e determines whether there is an IP address that has not been registered into the working table 71 among the IP addresses of the FC switches 41 though 44. When there is an IP address of the FC switches 41 through 44 that has not been registered into the working table 71 of FIG. 6, the CPU 60e branches the process from step S207, and returns it to step S202. On the other hand, when every IP address of the FC switches 41 through 44 has been registered into the working table 71 of FIG. 6 at least once, the CPU 60e advances the process to step S208.

In step S208, the CPU 60e determines whether a termination instruction has been inputted. When a termination instruction has not been inputted, the CPU 60e branches the process from step S208, and returns it to step S202. On the other hand, when a termination instruction has been inputted, the CPU 60e finishes the IP address reception subroutine of FIG. 5, and advances the process to step S102 in FIG. 4.

The step S101 corresponds to the reception procedure mentioned above, and the CPU 60e that executes the step S101 corresponds to a receiving section.

In step S102, the CPU 60e executes a server blade information acquisition subroutine.

FIG. 7 is a flowchart showing the server blade information acquisition subroutine.

At the first step S301 of the server blade information acquisition subroutine, the CPU 60e generates a working table for storing the below-mentioned server blade information on the DRAM 60f.

FIG. 8 shows a table showing an example of a data structure of a working table 72.

As shown in FIG. 8, a record of the working table 72 for storing server blade information has fields of a "management blade", a "slot", and a "power condition". The "management blade" field stores an IP address of a management IP port of the management blades 21 and 22. The "slot" field stores a slot number of a slot to which one of the server blades 31 through 34 is inserted. The "power condition" field stores the information about a power condition of the server blades 31 through 34. The information about the power condition is ON or OFF.

In step S301 of FIG. 7, the CPU 60e generates a new working table 72 for storing server blade information having no record on the DRAM 60f, and then advances the process to step S302.

In step S302, the CPU 60e reads one unfinished record from the working table 71 of FIG. 6 for storing IP addresses as a process target.

In the next step S303, the CPU 60e transmits a request to send server blade information to the IP address of the management blade 21 or 22 in the process target record. In the step S303, the CPU 60e requires the server blade information of all the server blades in the blade enclosure in which the management blades 21 or 22 is mounted. Server blade information includes a slot number of a slot into which the server blade 31, 32, 33, or 34 is inserted, and the information about a power condition of the server blade concerned.

In the next step S304, the CPU 60e receives the server blade information sent from the management blade 21 or 22 in response to the sending request.

In the next step S305, the CPU 60e additionally registers one record, which includes the server blade information and the IP address of the management blade 21 or 22, for each piece of the server blade information received in step S304 into the working table of FIG. 8.

In the next step S306, the CPU 60e determines whether all the records in the working table 71 of FIG. 6 for storing IP addresses have been processed. And if any one of the records in the working table 71 of FIG. 6 for storing IP addresses has not been processed, the CPU 60e branches the process from step S306, and returns it to step S302. On the other hand, if all the records in the working table 71 of FIG. 6 for storing IP addresses have been processed, the CPU 60e finishes the server blade information acquisition subroutine shown in FIG. 7, and advances the process to step S103 of FIG. 4.

The step S102 corresponds to the first acquisition procedure mentioned above, and the CPU 60e that executes the step S102 corresponds to is equivalent to a first acquisition section.

In step S103, the CPU 60e executes a power-on subroutine.

FIG. 9 is a flowchart showing the power-on subroutine.

In the first step S401 of the power-on subroutine, the CPU 60e reads one unfinished record from the working table 72 for storing server blade information of FIG. 8 as a process target.

In the next step S402, the CPU 60e determines whether the power condition in the process target record shows ON or OFF. And when the power condition in the process target record shows ON, the CPU 60e branches the process from step S402 to step S404. On the other hand, when the power condition in the process target record shows OFF, the CPU 60e advances the process to step S403.

In step S403, the CPU 60e transmits a request to turn on the server blade 31, 32, 33, or 34 in the slot specified by the slot number in the process target record to the IP address of the management blade 21 or 22 defined in the process target record. After transmission, the CPU 60e advances the process to step S404.

In step S404, the CPU 60e determines whether all the records in the working table 72 shown in FIG. 8 for storing server blade information have been processed. And if any one of the records in the working table 72 shown in FIG. 8 for storing server blade information has not been processed, the CPU 60e branches the process from step S404, and returns it to step S401. On the other hand, when all the records in the working table 72 shown in FIG. 8 for storing server blade information have been processed, the CPU 60e finishes the power-on subroutine of FIG. 9, and advances the process to step S104 of FIG. 4.

In step S104, the CPU 60e executes a power-on inspection subroutine.

FIG. 10 is a flowchart showing the power-on inspection subroutine.

At the first step S501 of the power-on inspection subroutine, the CPU 60e generates a working table 73 for storing power conditions of each of the server blades 31 through 34 on the DRAM 60f.

FIG. 11 shows a table showing an example of the data structure of the working table 73.

As shown in FIG. 11, a record of the working table 73 for storing power conditions has fields of a "management blade", a "slot", and a "power condition". The fields of the working table 73 have the same meanings as the fields of the working table 72 of FIG. 8 for storing server blade information.

In step S501 of FIG. 10, the CPU 60e generates a new working table 73 having no record on the DRAM 60f, and then advances the process to step S502.

In step S502, the CPU 60e reads one unfinished record from the working table 71 of FIG. 6 for storing IP addresses as a process target.

In the next step S503, the CPU 60e transmits a request to send server blade information to the IP address of the management blade 21 or 22 in the process target record. In step S503, the CPU 60e requires the server blade information of all the server blades in the blade enclosure in which the management blade 21 or 22 is mounted, in the same manner as in step S303

In the next step S504, the CPU 60e receives the server blade information sent from the management blade 21 or 22 in response to the sending request.

In the next step S505, the CPU 60e additionally registers one record, which includes the server blade information and the IP address of the management blade 21 or 22, for each piece of the server blade information received in step S504 into the working table 73 of FIG. 11.

In the next step S506, the CPU 60e determines whether all the records in the working table 71 of FIG. 6 for storing IP addresses have been processed. And if any one of the records in the working table 71 of FIG. 6 for storing IP addresses has not been processed, the CPU 60e branches the process from step S506, and returns it to step S502. On the other hand, when all the records in the working table 71 of FIG. 6 for storing IP addresses have been processed, the CPU 60e advances the process to step S507.

In step S507, the CPU 60e generates an inspection flag on the DRAM 60f, and sets "0" to the inspection flag as an initial value. The inspection flag shows the power conditions of all the records in the working table 73 of FIG. 11 for storing power conditions. When the power conditions of all the records show ON, the inspection flag becomes "0". When at least one record shows OFF, the inspection flag becomes "1".

In the next step S508, the CPU 60e determines whether the power condition information of any one record shows OFF in view of the power conditions of all the records in the working table 73 of FIG. 11 for storing power conditions. And when the power condition of at least one record shows OFF, the CPU 60e advances the process to step S509.

In step S509, the CPU 60e changes the state of an inspection flag to "1" from "0". Then, the CPU 60e finishes the power-on inspection subroutine of FIG. 11, and advances the process to step S105 of FIG. 4.

On the other hand, when there is no record whose power condition shows OFF, the CPU 60e keeps the inspection flag as "0", branches the process from step S508, finishes the power-on inspection subroutine of FIG. 11, and advances the process to step S105 of FIG. 4.

In step S105, the CPU 60e determines whether the inspection flag is "1" or "0". When the inspection flag is "1", the CPU 60e judges that the power-on process is imperfect. Therefore, the CPU 60e branches the process from step S105, and returns it to step S103 to re-execute the power-on subroutine in step S103 and the powering-on inspection subroutine in step S104 in order. On the other hand, when the inspection flag is "0", the CPU 60e judges that the power-on process is perfect, and advances the process to step S106.

These steps S103 through S105 correspond to the transmission procedure mentioned above, and the CPU 60e that executes these steps S103 through S105 corresponds to a transmission section.

In step S106, the CPU 60e executes an FC switch information acquisition subroutine.

FIG. 12 is a flowchart showing the FC switch information acquisition subroutine.

At the first step S601 of the FC switch information acquisition subroutine, the CPU 60e generates a working table 74 for storing the below-mentioned FC switch information on the DRAM 60f.

FIG. 13 shows a table showing an example of the data structure of the working table 74.

As shown in FIG. 13, a record of the working table 74 for storing FC switch information has fields of an "IP address", a "port", and a "hardware address". The "IP address" field stores an IP address of a management IP port of the FC switches 41 through 44. The "port" field stores a port number of a FC port of the FC switches 41 through 44. The "hardware switch" field stores a WWPN that is a hardware address assigned to an FC port of the server blades 31 through 34.

In step S601 of FIG. 12, the CPU 60e generates a new working table 74 having no record on the DRAM 60f, and then advances the process to step S602.

In step S602, the CPU 60e reads one unfinished record from the working table 71 of FIG. 6 for storing IP addresses as a process target.

In the next step S603, the CPU 60e transmits a request to send FC switch information to an IP address of the FC switches 41 through 44 in the process target record. In the step S603, the CPU 60e requires the FC switch information of all the FC switches 41 through 44. The FC switch information contains a port number of an FC port of one of the FC switches 41 through 44, and a hardware address of an FC port of one of the server blade 31 through 34 connected to the FC port of the FC switch concerned via a FC cable. Here, the FC switches 41 through 44 are able to acquire the WWPN's of the FC ports of the server blades 31 through 34 connected to the respective FC ports when the powers of the server blades 31 through 34 are ON even if OS software is not installed into the server blades 31 through 34.

In the next step S604, the CPU 60e receives the FC switch information sent from the FC switches 41 through 44 concerned in response to the sending request.

In the next step S605, the CPU 60e additionally registers one record, which includes the FC switch information and the IP addresses of the FC switch 41, 42, 43 or 44, for each piece of the FC switch information received in step S604 into the working table 74 of FIG. 13.

In the next step S606, the CPU 60e determines whether all the records in the working table 71 of FIG. 6 for storing IP addresses have been processed. And if any one of the records in the working table 71 shown in FIG. 6 for storing IP addresses has not been processed, the CPU 60e branches the process from step S606, and returns it to step S602. On the other hand, when all the records in the working table 71 shown in FIG. 6 for storing IP addresses have been processed, the CPU 60e finishes the FC switch information acquisition subroutine of FIG. 12 and advances the process to step S107 of FIG. 4.

The step S106 corresponds to the second acquisition procedure mentioned above, and the CPU 60e that executes the step S106 corresponds to a second acquisition section.

In step S107, the CPU 60e executes a connection-definition-table-generation subroutine.

FIGS. 14(a) and 14(b) are flowcharts showing the connection-definition-table-generation subroutine.

At the first step S701 of the connection-definition-table-generation subroutine, the CPU 60e generates a new connection definition table 61a having no record on the DRAM 60f. An example of the data structure of the connection definition table 61a has been already shown in FIG. 3. The CPU 60e advances the process to step S702 after creating a new connection definition table 61a.

In step S702, the CPU 60e reads one unfinished record from the working table 72 of FIG. 8 for storing server blade information as a process target. In FIGS. 14(a) and 14(b), the process-target record read from the working table 72 is represented by the record X for convenience. The CPU 60e advances the process to step S703, after reading the record X as the process target.

In step S703, the CPU 60e reads one unfinished record from the working table 71 of FIG. 6 for storing IP addresses as a process target. In FIGS. 14(a) and 14(b), the process-target record read from the working table 71 is represented by the record Y for convenience. The CPU 60e advances the process to step S704, after reading the record Y as the process target.

In step S704, the CPU 60e determines whether the IP address of the management blade 21 or 22 in the record X is coincident with the IP address of the management blade 21 or 22 in the record Y. And when the IP address of the management blade 21 or 22 in the record X is not coincident with the IP address of the management blade 21 or 22 in the record Y, the CPU 60e branches the process from step S704 to step S710. On the other hand, when the IP address of the management blade 21 or 22 in the record X is coincident with the IP address of the management blade 21 or 22 in the record Y, the CPU 60e advances the process to step S705.

In step S705, the CPU 60e reads one unfinished record from the working table 74 of FIG. 13 for storing FC switch information as a process target. In FIGS. 14(a) and 14(b), the process-target record read from the working table 74 is represented by the record Z for convenience. The CPU 60e advances the process to step S706, after reading the record Z as a process target.

In step S706, the CPU 60e determines whether the IP address of the FC switch 41, 42, 43, or 44 in the record Y is coincident with the IP address of the FC switch 41, 42, 43, or 44 in the record Z. And when the IP address of the FC switch 41, 42, 43, or 44 in the record Y is not coincident with the IP address of the FC switch 41, 42, 43, or 44 in the record Z, the CPU 60e branches the process from step S706 to step S709. On the other hand, when the IP address of the FC switch 41, 42, 43, or 44 in the record Y is coincident with the IP address of the FC switch 41, 42, 43, or 44 in the record Z, the CPU 60e advances the process to step S707.

In step S707, the CPU 60e determines whether the slot number in the record X is coincident with the port number in the record Z. And when the slot number in the record X is not coincident with the port number in the record Z, the CPU 60e branches the process from step S707 to step S709. On the other hand, when the slot number in the record X is coincident with the port number in the record Z, the CPU 60e advances the process to step S708.

In step S708, the CPU 60e additionally registers one record, which includes the IP address, the slot number, and WWPN of the management blade 21 or 22 in the record X, and the IP address and the port number of the FC switch 41, 42, 43, or 44 in the record Z, into the connection definition table 61a of FIG. 3. Then, the CPU 60e advances the process to step S709.

In step S709, the CPU 60e determines whether all the records in the working table 74 of FIG. 13 for storing FC switch information have been processed. And if any one of the records in the working table 74 of FIG. 13 for storing FC switch information has not been processed, the CPU 60e branches the process from step S709, and returns it to step S705. On the other hand, when all the records in the working table 74 of FIG. 13 for storing FC switch information have been processed, the CPU 60e advances the process to step S710.

In step S710, the CPU 60e determines whether all the records in the working table 71 of FIG. 6 for storing IP addresses have been processed. And if any one of the records in the working table 71 of FIG. 6 for storing IP addresses has not been processed, the CPU 60e branches the process from step S710, and returns it to step S703. On the other hand, when all the records in the working table 71 of FIG. 6 for storing IP addresses have been processed, the CPU 60e advances the process to step S711.

In step S711, the CPU 60e determines whether all the records in the working table 72 of FIG. 8 for storing server blade information have been processed. And if any one of the records in the working table 72 of FIG. 8 for storing server blade information has not been processed, the CPU 60e branches the process from step S711, and returns it to step S702. On the other hand, when all the records in the working table 72 of FIG. 8 for storing server blade information have been processed, the CPU 60e finishes the connection-definition-table-generation subroutine of FIGS. 14(*a*) and 14(*b*), and advances the process to step S108 in FIG. 4.

The step S107 corresponds to the generation procedure mentioned above, and the CPU 60e that executes the step S107 corresponds to a generation section.

In step S108, the CPU 60e executes a condition restoration subroutine.

FIG. 15 is a flowchart showing the condition restoration subroutine.

At the first step S801 of the condition restoration subroutine, the CPU 60e reads one unfinished record from the working table 72 of FIG. 8 for storing server blade information as a process target.

In the next step S802, the CPU 60e determines whether the power condition in the process target record shows power-ON or power-OFF. And when the power condition in the process target record shows power-ON, the CPU 60e branches the process from step S802 to step S804. On the other hand, when the power condition in the process target record shows power-OFF, the CPU 60e advances the process to step S803.

In step S803, the CPU 60e transmits a request to turn off the power of the server blade 31, 32, 33, or 34 of the slot specified by the slot number in the process target record to an IP address of the management blades 21 and 22 in the process target record. The CPU 60e advances the process to step S804 after the transmission.

In step S804, the CPU 60e determines whether all the records in the working table 72 of FIG. 8 for storing server blade information have been processed. And if any one of the records in the working table 72 of FIG. 8 for storing server blade information has not been processed, the CPU 60e branches the process from step S804, and returns it to step S801. On the other hand, when all the records in the working table 72 of FIG. 8 for storing server blade information have been processed, the CPU 60e finishes the condition restoration subroutine of FIG. 15, and advances the process to step S109 in FIG. 4.

In step S109, the CPU 60e executes a power-off inspection subroutine.

FIGS. 16(*a*) and 16(*b*) are flowcharts showing the power-off inspection subroutine.

In the first step S901 of the power-off inspection subroutine, the CPU 60e reads one unfinished record from the working table 71 of FIG. 6 for storing IP addresses as a process target.

In the next step S902, the CPU 60e transmits a request to send the server blade information to an IP address of the management blades 21 and 22 in a process target record. The CPU 60e requires the server blade information of all the server blades in the blade enclosure in which the management blade 21 or 22 is mounted, in the same manner as in steps S303 and S503.

In the next step S903, the CPU 60e receives the server blade information sent from the management blade 21 or 22 in response to the sending request.

In the next step S904, the CPU 60e updates the working table 73 of FIG. 11 based on the server blade information received in step S903. Specifically, the CPU 60e specifies a record in the working table 73 of FIG. 11 whose slot number and IP address of the management blade 21 or 22 at the sending side are coincident with that in the server blade information, and updates the power condition in the specified record by overwriting it with the power condition in the server blade information. The CPU 60e specifies and updates for the respective pieces of the server blade information.

In the next step S905, the CPU 60e determines whether all the records in the working table 71 of FIG. 6 for storing IP addresses have been processed. And when any one of the records in the working table 71 of FIG. 6 for storing IP addresses has not been processed, the CPU 60e branches the process from step S905, and returns it to step S901. On the other hand, when all the records in the working table 71 of FIG. 6 for storing IP addresses have been processed, the CPU 60e advances the process to step S906.

In step S906, the CPU 60e generates an inspection flag on the DRAM 60f, and sets "0" to the inspection flag as an initial value. A value of the inspection flag generated in step S906 has a different meaning from a value of the inspection flag generated in step S507. Specifically, when the power conditions in the respective records in the working table 73 of FIG. 11 for storing power conditions are coincident with the power conditions in the corresponding records in the working table 72 of FIG. 8 for storing server blade information, the value "0" is set to the inspection flag generated in step S906. On the other hand, when a power condition of any one of the records in the working table 73 of FIG. 11 is not coincident with the power condition of the corresponding record in the working table 72 of FIG. 8, the value "1" is set to the inspection flag.

In the next step S907, the CPU 60e reads one unfinished record from the working table 72 of FIG. 8 for storing server blade information as a process target. In FIG. 16(*b*), the process target record read in step S907 is represented by the record V for convenience. The CPU 60e advances the process to step S908, after reading the process target record V.

In step S908, the CPU 60e reads one unfinished record from the working table 73 of FIG. 11 for storing power conditions as a process target. In FIG. 16(*b*) the process target record read in step S908 is represented by the record W for convenience. The CPU 60e advances the process to step S909, after reading the process target record W.

In step S909, the CPU 60e determines whether the IP address of the management blade 21 or 22 in the record V is coincident with the IP address of the management blade 21 or 22 in the record W. And when the IP address of the management blade 21 or 22 in the record V is not coincident with the IP address of the management blade 21 or 22 in the record W, the CPU 60e branches the process from step S909 to step S912. On the other hand, when the IP address of the management blade 21 or 22 in the record V is coincident with the IP address of the management blade 21 or 22 in the record W, the CPU 60e advances the process to step S910.

In step S910, the CPU 60e determines whether the power condition in the record V is coincident with the power condition in the record W. And when the power condition in the record V is coincident with the power condition in the record W, the CPU 60e advances the process to step S912. On the other hand, when the power condition in the record V is not coincident with the power condition in the record W, the CPU 60e branches the process from step S910 to step S911.

In step S911, the CPU 60e changes the state of the inspection flag to "1" from "0". However, when the state of an inspection flag has been already "1", the CPU 60e does not change the state of the inspection flag. Then, the CPU 60e advances the process to step S912.

In step S912, the CPU 60e determines whether all the records in the working table 73 of FIG. 11 for storing power conditions have been processed. And if any one of records in the working table 73 of FIG. 11 for storing power conditions, the CPU 60e branches the process from step S912, and returns it to step S908. On the other hand, when all the records in the working table 73 of FIG. 11 for storing power conditions have been processed, the CPU 60e advances the process to step S913.

In step S913, the CPU 60e determines whether all the records in the working table 72 of FIG. 8 for storing server blade information have been processed. And if any one of records in the working table 72 of FIG. 8 for storing server blade information, the CPU 60e branches the process from step S913, and returns it to step S907. On the other hand, when all the records in the working table 72 of FIG. 8 for storing server blade information have been processed, the CPU 60e finishes the power-off inspection subroutine of FIGS. 16(a) and 16(b), and advances the process to step S110 of FIG. 4.

In step S110, the CPU 60e determines whether the inspection flag is "1" or "0". When the inspection flag is "1", the CPU 60e judges that the condition restoration process is imperfect. Therefore, the CPU 60e branches the process from step S110 and returns it to step S108 to re-execute the condition restoration subroutine in step S108 and the powering-off inspection subroutine in step S109 in order. On the other hand, when the inspection flag is "0", the CPU 60e judges that the condition restoration process is perfect, and finishes the automatic setting process of FIG. 4.

These steps S108 through S110 correspond to the restoration procedure mentioned above, and the CPU 60e that executes these steps S108 through S110 corresponds to a restoration section.

Next, operations and effects of the computer network system of the first embodiment will be described.

As mentioned above and as shown in FIG. 1, a network (SAN) manager connects the first and second blade enclosures 11 and 12 with the first and second storage devices 51 and 52, through the first through fourth FC switches 41 through 44, as a dual fabric connection. And then, the manager connects the management blades 21 and 22 and the first through fourth FC switches 41 through 44 to the SAN management device 60.

When the manager starts the automatic setting modular program 61b of the SAN management device 60 after the physical preliminary arrangements, an input screen will be displayed on the display 60a (step S202) The manager inputs the IP addresses "IPAD2" and "IPAD3" of the first and second FC switches 41 and 42, which are physically arranged between the first blade enclosure 11 and the first storage device 51, so as to be associated with the IP address "IPAD1" of the management blade 21 in the first blade enclosure 11 into the input screen. The manager inputs the IP addresses "IPAD5" and "IPAD6" of the third and fourth FC switches 43 and 44, which are physically arranged between the second blade enclosure 12 and the second storage device 52, so as to be associated with the IP address "IPAD4" of the management blade 22 in the second blade enclosure 12 into the input screen.

Then, the automatic-setting modular program 61b (the CPU 60e that executes the program) acquires the server blade information from the management blades 21 and 22 (step S102), turns on the powers of the server blades 31 through 34, and acquires the FC switch information from the FC switches 41 through 44 (steps S103 through S105, S106). Then, the program associates the slot numbers contained in the server blade information acquired from the management blades 21 and 22 to the port numbers contained in the FC switch information acquired from the FC switches 41 through 44 in one-to-one relationships (step S707; YES). The program generates records that are combinations of the server blade information and the FC switch information, and stores the generated records in the connection definition table 61a (step S708).

That is, the manager can let the SAN management device 60 generate the connection definition table 61a automatically by inputting the combinations of the management IP addresses of the management blades 21 and 22 and the IP addresses of the FC switches 41 through 44 into the SAN management device 60 without installing OS software into the server blades 31 through 34 or reading setting information based on the BIOS screen.

Further, after generating the connection definition table 61a, the automatic setting modular program 61b turns off the power of a server blade 31, 32, 33, or 34 whose power was turned off before the program started. Therefore, the conditions of the first and second blade enclosures 11 and 12 do not change even if the connection definition table 61a is generated.

Second Embodiment

FIG. 17 is a block diagram of the computer network system of the second embodiment.

As shown in FIG. 17, the computer network system of the second embodiment is provided with network devices such as load balancers that are connected to external networks N1 and N2 instead of the first and second storage devices 51 and 52 in the first embodiment. Further, first through fourth switching hubs 41' through 44' are adopted between the first and second blade enclosures 11 and 12, and the network devices to form dual fabric LAN's. Still further, a LAN management device 60' is adopted in the system of the second embodiment instead of the SAN management device 60 in the system of the first embodiment.

Moreover, each of the server blades 31' through 34' in the system of the second embodiment is provided with a plurality of LAN ports instead of the FC ports in the first embodiment. MAC (Media Access Control) addresses "MACAD1" through "MACAD8" are assigned to the respective LAN ports instead of the hardware addresses "WWPN1" through "WWPN8" in the first embodiment.

The first through fourth switching hubs 41' through 44' are communication devices that transmit packets between the ports to which the network devices of the networks N1 and N2 are connected and the LAN ports to which the server blades are connected. These switching hubs 41' through 44' also have management IP ports.

The LAN management device 60' includes LAN management tool software for managing the dual fabric LAN formed by the switching hubs 41' through 44' as with the SAN management device 60 of the first embodiment. The LAN management tool software contains the automatic setting modular program as with the first embodiment. The CPU 60e on which the automatic setting modular program runs executes the fundamentally same process as the process shown in FIG. 4 (FIG. 5, FIG. 7, FIG. 9, FIG. 10, FIG. 12, FIG. 14(*a*), FIG. 14(*b*), FIG. 15, FIG. 16(*a*), and FIG. 16(*b*)). The process of the second embodiment is different from that of the first embodiment in the following points:

(1) The process acquires IP addresses of the switching hubs 41' through 44' instead of the IP addresses of the FC switch 41 through 44.

(2) The automatic setting modular program communicates with the switching hubs 41' through 44' instead of the FC switches 41 through 44.

(3) The hardware addresses of the server blades 31' through 34' acquired by the automatic setting modular program through the switching hubs are the MAC addresses.

There are following operations and effects according to the second embodiment.

As shown in FIG. 17, a network (SAN) manager connects the first and second blade enclosures 11 and 12 with the network devices of the first and second networks N1 and N2, through the first through fourth switching hubs 41' through 44', as a dual fabric connection. And then, the manager connects the management blades 21 and 22, and the first through fourth switching hubs 41' through 44' with the LAN management device 60'.

When the manager starts the automatic setting modular program of the LAN management device 60' after the physical preliminary arrangements, an input screen will be displayed on the display 60a (step S202). The manager inputs the IP addresses "IPAD2" and "IPAD3" of the first and second switching hubs 41' and 42', which are physically arranged between the first blade enclosure 11 and the network device of the first network N1, so as to be associated with the IP address "IPAD1" of the management blade 21 in the first blade enclosure 11 into the input screen. The manager inputs the IP addresses "IPAD5" and "IPAD6" of the third and fourth switching hubs 43' and 44', which are physically arranged between the second blade enclosure 12 and the network device of the second network N2, so as to be associated with the IP address "IPAD4" of the management blade 22 in the second blade enclosure 12 into the input screen.

Then, the automatic-setting modular program (the CPU 60e that executes the program) acquires the server blade information from the management blades 21 and 22 (step S102), turns on the powers of the server blades 31 through 34, and acquires switching hub information (port numbers and MAC addresses) from the switching hubs 41' through 44' (steps S103 through S105, S106). Then, the program associates the slot numbers contained in the server blade information acquired from the management blades 21 and 22 to the port numbers contained in the switching hub information acquired from the switching hubs 41' through 44' in one-to-one relationships (step S707; YES). The program generates records that are combinations of the server blade information and the switching hub information, and stores the generated records in the connection definition table 61a (step S708).

That is, even if the dual fabric LAN is formed among the first and second blade enclosures 11 and 12 and the network devices in the second embodiment, the manager can let the LAN management device 60' generate the connection definition table 61a automatically by inputting the combinations of the management IP addresses of the management blades 21 and 22 and the IP addresses of the switching hubs 41' through 44' into the LAN management device 60' without installing OS software into the sever blades 31 through 34 or reading setting information based on the BIOS screen.

Third Embodiment

FIG. 18 is a block diagram of the SAN management device 60 according to the third embodiment.

As shown in FIG. 18, the SAN management tool 61 of the third embodiment includes modules 61c and 61d that are different from the automatic setting modular program 61b of the first embodiment. As mentioned above, the automatic setting modular program 61b of the first embodiment receives the combinations of the management IP addresses of the management blades 21 and 22 and the IP addresses of the FC switches 41 through 44 from an operator, and generates the connection definition table 61a of FIG. 3. On the other hand, a trap monitor module 61c and an automatic-updating module 61d that are built into the SAN management tool 61 of the third embodiment are a module for updating the contents of connection definition table 61a automatically, when there is a predetermined renewal of hardware.

An SNMP (Simple Network Management Protocol) agent (not shown) is introduced to each of the management blades 21, 22 and the FC switches 41 through 44. An SNMP manager is introduced into SAN management device 60. As everyone knows, an SNMP is a protocol for monitoring and controlling a communication device connected to a TCP/IP (Transmission Control Protocol/Internet Protocol) network through the network. The SNMP agent in a communication device detects an event such as a change of state and an obstacle in the communication device, and gives the SNMP manager one-way communication called an event notification (a trap).

A trap monitor module 61c in the third embodiment is a modular program that monitors a trap about a hardware update that is transmitted from the management blade 21 or 22, or from the FC switch 41, 42, 43, or 44. A hardware update occurs when a server blade is additionally installed to the blade enclosure 11 or 12 and is connected to the FC switch, when a server blade is removed from the blade enclosure 11 or 12, when a server blade in a certain slot is exchanged for a server blade of another slot within one blade enclosure, or when an FC cable of a certain FC port is exchanged for an FC cable of another FC port within one FC switch. That is, the hardware update means that the topology of a server blade and a fabric is changed. The trap monitor module 61c monitors a trap that is transmitted from the SNMP agent (not shown) in the management blade 21 or 22 when the agent detects the state change of the hardware due to the above-mentioned change of topology. The trap monitor module 61c immediately starts after the start of the SAN management device 60 or after the process end. Starting of the trap monitor module 61c starts a trap monitoring process.

On the other hand, the automatic-updating module 61d is a modular program that reflects a hardware update to the connection definition table 61a when the trap monitor module 61c detects a trap of a hardware update. The automatic-updating module 61d starts with a direction from the trap monitor module 61c. Starting of the automatic-updating module 61d starts a automatic-updating process.

FIG. 19 is a flowchart showing the trap monitoring process.

In a first step S1001 of the trap monitoring process, the CPU 60e waits until the time when a trap about a hardware update is transmitted from the management blade 21 or 22, or from the FC switch 41, 42, 43, or 44. Receiving a trap about a hardware update, the CPU 60e advances the process to step S1002.

In step S1002, the CPU 60e directs the starting of the automatic-updating module 61d. Then, the CPU 60e finishes the trap monitoring process shown in FIG. 19.

FIG. 20 is a flowchart showing the automatic-updating process.

In a first step S1101 of the automatic-updating process, the CPU 60e calls a connection information acquisition subroutine.

FIG. 21 is a flowchart showing the connection information acquisition subroutine.

In a first step S1201 of the subroutine, the CPU 60e newly generates the working table 71 of FIG. 6 for storing IP addresses on the DRAM 60f, and then, advances the process to step S1202.

In step S1202, the CPU 60e reads all the combinations of the IP addresses of the management IP ports of the management blades 21 and 22, and the IP addresses of the management IP ports of the FC switches 41 through 44 from the connection-definition table 61a of FIG. 3.

In the next step S1203, the CPU 60e writes the combinations of the IP addresses read in step S1202 into the working table 71 that is newly generated in step S1201. Then, the CPU 60e finishes the connection information acquisition subroutine shown in FIG. 21, and advances the process to step S1102 of FIG. 20.

Thus, in step S1101, the CPU 60e reads the combinations of the IP addresses of the management blades 21, 22 and the FC switches 41 through 44 from the connection-definition table 61a of FIG. 3, and then, the CPU 60e writes the combinations into the working table 71 of FIG. 6. Step S101 in the automatic setting process (FIG. 4) of the first embodiment accepts the combination of the IP addresses from an operator. The third embodiment is different from the first embodiment at this point. The process in steps S1102 through S1106 and S1108 through S1110 after the step S1101 is identical to that in the steps S102 through S106 and S108 through S110 of FIG. 4.

However, the process content in step S1107 of FIG. 20 is slightly different from that in step S107 of FIG. 4. Specifically, step S701 in the connection-definition-table-creation subroutine (FIGS. 14(a) and 14(b)) in step S107 of FIG. 4 is omitted in the connection-definition-table-creation subroutine in step S1107 of FIG. 20. In step S708 of FIG. 14(b), a record is added to the connection-definition table 61a. On the other hand, in step S708 in the connection-definition-table-creation subroutine of step S1107 of FIG. 20, records, which include the IP addresses, the slot numbers, and the port numbers that are same as the process target records X, Y, and Z, in the connection-definition table 61a are updated.

Since the third embodiment is constructed as above, the connection-definition table 61a of FIG. 3 is updated when the hardware is updated as explained with an example without changing the connections among the blade enclosures 21, 22 and the FC switches 41 through 44. Thereby, an administrator can update the connection-definition table 61a easily with just a physical connection, such as additional installation of a server blade, and a removal thereof.

Although the fabric is constituted of the FC switches 41 through 44 in the third embodiment, the fabric is not limited to this constitution. Even if the fabric is constituted of the switching hubs 41' through 44' as with the second embodiment, of course, the effect of the third embodiment will be acquired.

Fourth Embodiment

The fourth embodiment enables to update the connection-definition table 61a of FIG. 3 in response to a hardware update, even when the SNMP agents are not installed into the management blades 21, 22, and into the FC-switches 41 through 44. At this point, the fourth embodiment is different from the third embodiment.

FIG. 22 is a block diagram of the SAN management device 60 of the fourth embodiment.

Comparison of FIG. 22 to FIG. 18 makes clear that the SAN management device 60 of the fourth embodiment is provided with a periodic direction module 61e instead of the trap monitor module 61c of the third embodiment. The periodic direction module 61e directs an execution of the automatic-updating module 61d periodically. The periodic direction module 61e starts just after the start of the SAN management device 60. When the periodic direction module 61e starts, a periodic direction process starts.

FIG. 23 is a flowchart showing the periodic direction process.

In a first step S2001 of the periodic direction process, the CPU 60e waits until the predetermined time elapses. When the predetermined time elapses, the CPU 60e advances the process to step S2002.

In step S2002, the CPU 60e directs the starting of the automatic-updating module 61d. Then, the CPU 60e returns the process to step S2001.

The automatic-updating module 61d is identical to that of the third embodiment and it has been described using FIG. 20 and FIG. 21.

Since the fourth embodiment is constructed as above, the automatic-updating module 61d is executed periodically. Therefore, the connection-definition table 61a of FIG. 3 is updated when the hardware is updated as explained with an example without changing the connections among the blade enclosures 21, 22 and the FC switches 41 through 44. Thereby, an administrator can update the connection-definition table 61a easily with just a physical connection, such as additional installation of a server blade, and a removal thereof.

In the fourth embodiment, the fabric may be constituted of the FC switches 41 through 44, and may be constituted of the switching hubs 41' through 44'. In any case, the effect of the fourth embodiment can be acquired.

What is claimed is:

1. A network management method to manage a network that includes a plurality of fabrics network switches that connect server blades in slots of blade enclosures to storage devices, said method making a computer execute procedures comprising:

a reception procedure for receiving, from an operator through an input device, combinations each of which includes an IP address of a management port of a management blade and an IP address of a management port of a network switch that is connected to a server blade in the blade enclosure that contains said management blade;

a first acquisition procedure for acquiring a slot number and a power condition of a slot in the blade enclosure that contains the management blade identified by the IP address of each of the combinations received in said reception procedure from the identified management blade, and for storing each of the acquired slot numbers and power condition associated with the IP address of said management blade into a first table;

a transmission procedure for transmitting a request to every management blade identified by the IP address of each of the received combinations so as to turn on the power of the slots in the same blade enclosure corresponding to the identified management blade through a communication device;

a second acquisition procedure for acquiring a port number of a port of the network switch identified by the IP address of each of the combinations received in said reception procedure and a hardware address of a port of the server blade that is physically connected to said port of said network switch from said network switch, and for storing each of the acquired port numbers and hardware addresses associated with the IP address of said network switch into a second table;

a generation procedure for reading a record corresponding to an IP address of a management blade in each of said combinations received in said reception procedure from said first table and a record corresponding to an IP address of a network switch in said combination from the second table, and for storing the read records associated with each other into a third table; and a restoration procedure for transmitting a request to the management blade identified by the IP address in each of records in said first table whose power condition represent off so as to turn off the power of the slot identified by the slot number in each of the records through the communication device, wherein said network switches are fiber channel switches.

2. A network management method to manage a network that includes a plurality of fabrics network switches that connect server blades in slots of blade enclosures to storage devices, said method making a computer execute procedures comprising:

a reception procedure for receiving, from an operator through an input device, combinations each of which includes an IP address of a management port of a management blade and an IP address of a management port of a network switch that is connected to a server blade in the blade enclosure that contains said management blade;

a first acquisition procedure for acquiring a slot number and a power condition of a slot in the blade enclosure that contains the management blade identified by the IP address of each of the combinations received in said reception procedure from the identified management blade, and for storing each of the acquired slot numbers and power condition associated with the IP address of said management blade into a first table;

a transmission procedure for transmitting a request to every management blade identified by the IP address of each of the received combinations so as to turn on the power of the slots in the same blade enclosure corresponding to the identified management blade through a communication device;

a second acquisition procedure for acquiring a port number of a port of the network switch identified by the IP address of each of the combinations received in said reception procedure and a hardware address of a port of the server blade that is physically connected to said port of said network switch from said network switch, and for storing each of the acquired port numbers and hardware addresses associated with the IP address of said network switch into a second table;

a generation procedure for reading a record corresponding to an IP address of a management blade in each of said combinations received in said reception procedure from said first table and a record corresponding to an IP address of a network switch in said combination from the second table, and for storing the read records associated with each other into a third table; and a restoration procedure for transmitting a request to the management blade identified by the IP address in each of records in said first table whose power condition represent off so as to turn off the power of the slot identified by the slot number in each of the record through the communication device, wherein said network switches are switching hubs.

3. A network management method to manage a network that includes a plurality of fabrics network switches that connect server blades in slots of blade enclosures to storage devices, said method making a computer execute procedures comprising:

a storing procedure for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading procedure for reading every combination of the IP address of said blade enclosure and the IP address of said network switch from said connection-definition table when a change of a connection state between said server blades and fabrics is detected;

a first acquisition procedure for acquiring a slot number and a power condition of a slot in the blade enclosure that contains the management blade identified by the IP address of each of the combinations read in said reading procedure from said identified management blade, and for storing each of the acquired slot numbers and power condition associated with the IP address of said management blade into a first table;

a transmission procedure for transmitting a request to every management blade identified by the IP address of each of the combinations read in said reading procedure so as to turn on the powers of the slots in the same blade enclosure corresponding to the identified management blade through a communication device;

a second acquisition procedure for acquiring a port number of a port of the network switch identified by the IP address of each of the combinations read in said reading procedure and a hardware address of a port of the server blade that is physically connected to said port of said network switch from said network switch, and for storing each of the acquired port numbers and hardware addresses associated with the IP address of said network switch into a second table;

an update procedure for reading a record corresponding to an IP address of a management blade in each of said combinations read in said reading procedure from said first table and a record corresponding to an IP address of a network switch in said combination from the second table, and for updating the corresponding records in said connection definition table based on both read records; and a restoration procedure for transmitting a request to the management blade identified by the IP address in each of records in said first table whose power condition represent off so as to turn off the power of the slot identified by the slot number in each of the records through the communication device, wherein said network switches are fiber channel switches.

4. A network management method to manage a network that includes a plurality of fabrics network switches that connect server blades in slots of blade enclosures to storage devices, said method making a computer execute procedures comprising:

a storing procedure for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading procedure for reading every combination of the IP address of said blade enclosure and the IP address of said network switch from said connection-definition table when a change of a connection state between said server blades and fabrics is detected;

a first acquisition procedure for acquiring a slot number and a power condition of a slot in the blade enclosure that contains the management blade identified by the IP address of each of the combinations read in said reading procedure from said identified management blade, and for storing each of the acquired slot numbers and power condition associated with the IP address of said management blade into a first table;

a transmission procedure for transmitting a request to every management blade identified by the IP address of each of the combinations read in said reading procedure so as to turn on the power of the slots in the same blade enclosure corresponding to the identified management blade through a communication device;

a second acquisition procedure for acquiring a port number of a port of the network switch identified by the IP address of each of the combinations read in said reading procedure and a hardware address of a port of the server blade that is physically connected to said port of said network switch from said network switch, and for storing each of the acquired port numbers and hardware addresses associated with the IP address of said network switch into a second table;

an update procedure for reading a record corresponding to an IP address of a management blade in each of said combinations read in said reading procedure from said first table and a record corresponding to an IP address of a network switch in said combination from the second table, and for updating the corresponding records in said connection definition table based on both read records; and a restoration procedure for transmitting a request to the management blade identified by the IP address in each of records in said first table whose power condition represent off so as to turn off the power of the slot identified by the slot number in each of the record through the communication device, wherein said network switches are switching hubs.

5. A computer readable non-transitory medium that stores a network management program to manage a network that includes a plurality of fabrics network switches that connect server blades in slots of blade enclosures to storage devices, said program making a computer execute functions comprising:

a reception function for receiving, from an operator through an input device, combinations each of which includes an IP address of a management port of a management blade and an IP address of a management port of a network switch that is connected to a server blade in the blade enclosure that contains said management blade;

a first acquisition function for acquiring a slot number and a power condition of a slot in the blade enclosure that contains the management blade identified by the IP address of each of the combinations received in said reception function from the identified management blade, and for storing each of the acquired slot numbers and power condition associated with the IP address of said management blade into a first table;

a transmission function for transmitting a request to the management blade identified by the IP address of each of the received combinations so as to turn on the power of the slots in the blade enclosure corresponding to the identified management blade through a communication device;

a second acquisition function for acquiring a port number of a port of the network switch identified by the IP address of each of the combinations received in said reception function and a hardware address of a port of the server blade that is physically connected to said port of said network switch from said network switch, and for storing each of the acquired port numbers and hardware addresses associated with the IP address of said network switch into a second table;

a generation function for reading a record corresponding to an IP address of a management blade in each of said combinations received in said reception function from said first table and a record corresponding to an IP address of a network switch in said combination from the second table, and for storing the read records associated with each other into a third table; and a restoration function for transmitting a request to the management blade identified by the IP address in each of records in said first table whose power condition represent off so as to turn off the power of the slot identified by the slot number in each of the records through the communication device, wherein said network switches are fiber channel switches.

6. A computer readable non-transitory medium that stores a network management program to manage a network that includes a plurality of fabrics network switches that connect server blades in slots of blade enclosures to storage devices, said program making a computer execute functions comprising:

a reception function for receiving, from an operator through an input device, combinations each of which includes an IP address of a management port of a management blade and an IP address of a management port of a network switch that is connected to a server blade in the blade enclosure that contains said management blade;

a first acquisition function for acquiring a slot number and a power condition of a slot in the blade enclosure that contains the management blade identified by the IP address of each of the combinations received in said reception function from the identified management blade, and for storing each of the acquired slot numbers and power condition associated with the IP address of said management blade into a first table;

a transmission function for transmitting a request to the management blade identified by the IP address of each of the received combinations so as to turn on the power of the slots in the blade enclosure corresponding to the identified management blade through a communication device;

a second acquisition function for acquiring a port number of a port of the network switch identified by the IP address of each of the combinations received in said reception function and a hardware address of a port of the server blade that is physically connected to said port of said network switch from said network switch, and for storing each of the acquired port numbers and hardware addresses associated with the IP address of said network switch into a second table;

a generation function for reading a record corresponding to an IP address of a management blade in each of said combinations received in said reception function from said first table and a record corresponding to an IP address of a network switch in said combination from the second table, and for storing the read records associated with each other into a third table; and a restoration function for transmitting a request to the management blade identified by the IP address in each of records in said first table whose power condition represent off so as to turn off the power of the slot identified by the slot number in each of the records through the communication device, wherein said network switches are switching hubs.

7. A computer readable non-transitory medium that stores a network management program to manage a network that includes a plurality of fabrics network switches that connect server blades in slots of blade enclosures to storage devices, said program making a computer execute functions comprising:

a storing function for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading function for reading every combination of the IP address of said blade enclosure and the IP address of said network switch from said connection-definition table when a change of a connection state between said server blades and fabrics is detected;

a first acquisition function for acquiring a slot number and a power condition of a slot in the blade enclosure that contains the management blade identified by the IP address of each of the combinations read in said reading function from said identified management blade, and for storing each of the acquired slot numbers and power condition associated with the IP address of said management blade into a first table;

a transmission function for transmitting a request to every management blade identified by the IP address of each of the combinations read in said reading function so as to turn on the power of the slots in the same blade enclosure corresponding to the identified management blade through a communication device;

a second acquisition function for acquiring a port number of a port of the network switch identified by the IP address of each of the combinations read in said reading function and a hardware address of a port of the server blade that is physically connected to said port of said network switch from said network switch, and for storing each of the acquired port numbers and hardware addresses associated with the IP address of said network switch into a second table;

an update function for reading a record corresponding to an IP address of a management blade in each of said combinations read in said reading function from said first table and a record corresponding to an IP address of a network switch in said combination from the second table, and for updating the corresponding records in said connection definition table based on the both read records; and a restoration function for transmitting a request to the management blade identified by the IP address in each of records in said first table whose power condition represent off so as to turn off the power of the slot identified by the slot number in each of the records through the communication, wherein said network switches are fiber channel switches.

8. A computer readable non-transitory medium that stores a network management program to manage a network that includes a plurality of fabrics network switches that connect server blades in slots of blade enclosures to storage devices, said program making a computer execute functions comprising:

a storing function for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading function for reading every combination of the IP address of said blade enclosure and the IP address of said network switch from said connection-definition table when a change of a connection state between said server blades and fabrics is detected;

a first acquisition function for acquiring a slot number and a power condition of a slot in the blade enclosure that contains the management blade identified by the IP address of each of the combinations read in said reading function from said identified management blade, and for storing each of the acquired slot numbers and power condition associated with the IP address of said management blade into a first table;
a transmission function for transmitting a request to every management blade identified by the IP address of each of the combinations read in said reading function so as to turn on the power of the slots in the same blade enclosure corresponding to the identified management blade through a communication device;
a second acquisition function for acquiring a port number of a port of the network switch identified by the IP address of each of the combinations read in said reading function and a hardware address of a port of the server blade that is physically connected to said port of said network switch from said network switch, and for storing each of the acquired port numbers and hardware addresses associated with the IP address of said network switch into a second table;
an update function for reading a record corresponding to an IP address of a management blade in each of said combinations read in said reading function from said first table and a record corresponding to an IP address of a network switch in said combination from the second table, and for updating the corresponding records in said connection definition table based on the both read records; and
a restoration function for transmitting a request to the management blade identified by the IP address in each of records in said first table whose power condition represent off so as to turn off the power of the slot identified by the slot number in each of the records through the communication,
wherein said network switches are switching hubs.

9. A network management apparatus to manage a network that includes a plurality of fabrics network switches that connect server blades in slots of blade enclosures to storage devices, said apparatus comprising:
a reception section for receiving, from an operator through an input device, combinations each of which includes an IP address of a management port of a management blade and an IP address of a management port of a network switch that is connected to a server blade in the blade enclosure that contains said management blade;
a first acquisition section for acquiring a slot number and a power condition of a slot in the blade enclosure that contains the management blade identified by the IP address of each of the combinations received in said reception section from the identified management blade, and for storing each of the acquired slot numbers and power condition associated with the IP address of said management blade into a first table;
a transmission section for transmitting a request to the management blade identified by the IP address of each of the received combinations so as to turn on the power of the slots in the blade enclosure corresponding to the identified management blade through a communication device;
a second acquisition section for acquiring a port number of a port of the network switch identified by the IP address of each of the combinations received in said reception section and a hardware address of a port of the server blade that is physically connected to said port of said network switch from said network switch, and for storing each of the acquired port numbers and hardware addresses associated with the IP address of said network switch into a second table;
a generation section for reading a record corresponding to an IP address of a management blade in each of said combinations received in said reception section from said first table and a record corresponding to an IP address of a network switch in said combination from the second table, and for storing the read records associated with each other into a third table; and
a restoration section for transmitting a request to the management blade identified by the IP address in each of records in said first table whose power condition represent off so as to turn off the power of the slot identified by the slot number in each of the records through the communication,
wherein said network switches are fiber channel switches.

10. A network management apparatus to manage a network that includes a plurality of fabrics network switches that connect server blades in slots of blade enclosures to network devices, said apparatus comprising:
a reception section for receiving, from an operator through an input device, combinations each of which includes an IP address of a management port of a management blade and an IP address of a management port of a network switch that is connected to a server blade in the blade enclosure that contains said management blade;
a first acquisition section for acquiring a slot number and a power condition of a slot in the blade enclosure that contains the management blade identified by the IP address of each of the combinations received in said reception section from the identified management blade, and for storing each of the acquired slot numbers and power condition associated with the IP address of said management blade into a first table;
a transmission section for transmitting a request to the management blade identified by the IP address of each of the received combinations so as to turn on the power of the slots in the blade enclosure corresponding to the identified management blade through a communication device;
a second acquisition section for acquiring a port number of a port of the network switch identified by the IP address of each of the combinations received in said reception section and a hardware address of a port of the server blade that is physically connected to said port of said network switch from said network switch, and for storing each of the acquired port numbers and hardware addresses associated with the IP address of said network switch into a second table;
a generation section for reading a record corresponding to an IP address of a management blade in each of said combinations received in said reception section from said first table and a record corresponding to an IP address of a network switch in said combination from the second table, and for storing the read records associated with each other into a third table; and
a restoration section for transmitting a request to the management blade identified by the IP address in each of records in said first table whose power condition represent off so as to turn off the power of the slot identified by the slot number in each of the records through the communication,
wherein said network switches are switching hubs.

11. A network management apparatus to manage a network that includes a plurality of fabrics network switches that connect server blades in slots of blade enclosures to storage devices, said apparatus comprising:
a storing section for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading section for reading every combination of the IP address of said blade enclosure and the IP address of said network switch from said connection-definition table when a change of a connection state between said server blades and fabrics is detected;

a first acquisition section for acquiring a slot number and a power condition of a slot in the blade enclosure that contains the management blade identified by the IP address of each of the combinations read in said reading section from said identified management blade, and for storing each of the acquired slot numbers and power condition associated with the IP address of said management blade into a first table;

a transmission section for transmitting a request to even/ management blade identified by the IP address of each of the combinations read in said reading section so as to turn on the power of the slots in the same blade enclosure corresponding to the identified management blade through a communication device;

a second acquisition section for acquiring a port number of a port of the network switch identified by the IP address of each of the combinations read in said reading section and a hardware address of a port of the server blade that is physically connected to said port of said network switch from said network switch, and for storing each of the acquired port numbers and hardware addresses associated with the IP address of said network switch into a second table;

an update section for reading a record corresponding to an IP address of a management blade in each of said combinations read in said reading section from said first table and a record corresponding to an IP address of a network switch in said combination from the second table, and for updating the corresponding records in said connection definition table based on the both read records; and a restoration section for transmitting a request to the management blade identified by the IP address in each of records in said first table whose power condition represent off so as to turn off the power of the slot identified by the slot number in each of the records through the communication, wherein said network switches are fiber channel switches.

12. A network management apparatus to manage a network that includes a plurality of network switches that connect server blades in slots of blade enclosures to network devices, said apparatus comprising:

a storing section for storing a connection-definition table into storage, said connection-definition table storing various pieces of information, which are associated with one another, for each of said plurality of server blades, said information containing an IP address and a hardware address of a management port of a management blade in a blade enclosure that contains a server blade concerned, a port number of a network switch that is physically connected to said management port, an IP address of a management port of said network switch, and a number of a slot to which said server blade is inserted;

a reading section for reading every combination of the IP address of said blade enclosure and the IP address of said network switch from said connection- definition table when a change of a connection state between said server blades and fabrics is detected;

a first acquisition section for acquiring a slot number and a power condition of a slot in the blade enclosure that contains the management blade identified by the IP address of each of the combinations read in said reading section from said identified management blade, and for storing each of the acquired slot numbers and power condition associated with the IP address of said management blade into a first table;

a transmission section for transmitting a request to every management blade identified by the IP address of each of the combinations read in said reading section so as to turn on the power of the slots in the same blade enclosure corresponding to the identified management blade through a communication device;

a second acquisition section for acquiring a port number of a port of the network switch identified by the IP address of each of the combinations read in said reading section and a hardware address of a port of the server blade that is physically connected to said port of said network switch from said network switch, and for storing each of the acquired port numbers and hardware addresses associated with the IP address of said network switch into a second table;

an update section for reading a record corresponding to an IP address of a management blade in each of said combinations read in said reading section from said first table and a record corresponding to an IP address of a network switch in said combination from the second table, and for updating the corresponding records in said connection definition table based on the both read records; and a restoration section for transmitting a request to the management blade identified by the IP address in each of records in said first table whose power condition represent off so as to turn off the power of the slot identified by the slot number in each of the records through the communication device, wherein said network switches are switching hubs.

* * * * *

UNITED STATES PATENT AND TRADEMARK OFFICE
CERTIFICATE OF CORRECTION

| | | |
|---|---|---|
| PATENT NO. | : 7,953,835 B2 | Page 1 of 1 |
| APPLICATION NO. | : 11/975639 | |
| DATED | : May 31, 2011 | |
| INVENTOR(S) | : Shigehiro Yoshikawa | |

It is certified that error appears in the above-identified patent and that said Letters Patent is hereby corrected as shown below:

In the Claims:

Col. 29, line 22, delete "even/" and insert --every--.

Signed and Sealed this
Twenty-third Day of August, 2011

David J. Kappos
*Director of the United States Patent and Trademark Office*